United States Patent
Iwama et al.

(10) Patent No.: US 8,097,365 B2
(45) Date of Patent: Jan. 17, 2012

(54) ELECTRODE CURRENT COLLECTOR AND METHOD FOR INSPECTING THE SAME, ELECTRODE FOR BATTERY AND METHOD FOR PRODUCING THE SAME, AND SECONDARY BATTERY AND METHOD FOR PRODUCING THE SAME

(75) Inventors: Masayuki Iwama, Fukushima (JP); Kenichi Kawase, Fukushima (JP); Rikako Imoto, Fukushima (JP); Akinori Kita, Fukushima (JP); Kotaro Satori, Kanagawa (JP)

(73) Assignee: Sony Corporation, Tokyo (JP)

( * ) Notice: Subject to any disclaimer, the term of this patent is extended or adjusted under 35 U.S.C. 154(b) by 1209 days.

(21) Appl. No.: 11/767,757

(22) Filed: Jun. 25, 2007

(65) Prior Publication Data

US 2008/0176144 A1  Jul. 24, 2008

(30) Foreign Application Priority Data

Jun. 29, 2006  (JP) ................. 2006-180216

(51) Int. Cl.
  *H01M 4/66* (2006.01)
  *H01M 4/58* (2010.01)
  *B32B 15/00* (2006.01)

(52) U.S. Cl. ....... 429/245; 429/209; 29/623.5; 428/209; 205/291

(58) Field of Classification Search .............. 429/122, 429/209, 245; 29/623.1, 623.5; 205/182, 205/291; 428/209
See application file for complete search history.

(56) References Cited

U.S. PATENT DOCUMENTS

| 6,051,340 | A | 4/2000 | Kawakami et al. |
| 6,432,579 | B1 | 8/2002 | Tsuji et al. |
| 6,685,804 | B1 | 2/2004 | Ikeda et al. |
| 7,235,330 | B1 * | 6/2007 | Fujimoto et al. ............. 429/245 |
| 2002/0015833 | A1 * | 2/2002 | Takahashi et al. ............. 428/209 |

FOREIGN PATENT DOCUMENTS

| JP | 08-050922 | | 2/1996 |
| JP | 09-306504 | | 11/1997 |
| JP | 2948205 | | 2/1999 |
| JP | 11-135115 | | 5/1999 |
| JP | 2001357855 | A * | 12/2001 |
| JP | 2002-083594 | | 3/2002 |
| JP | 2005-209377 | | 8/2005 |
| JP | 2006-155959 | | 6/2006 |
| WO | WO 0131722 | A1 * | 5/2001 |

OTHER PUBLICATIONS

Machine translation for Kojima et al., JP 2001-357855 A.*
A Japanese Office Action dated Dec. 11, 2008 issued in connection with counterpart Japanese Patent Application No. 2006-180216.

* cited by examiner

*Primary Examiner* — Barbara Gilliam
*Assistant Examiner* — Edu E Enin-Okut
(74) *Attorney, Agent, or Firm* — SNR Denton US LLP

(57) ABSTRACT

A current collector forming an electrode for battery. The electrode current collector is made of copper or a copper alloy, and has a front surface color and a back surface color, at least one color of which is a color belonging to a color space represented by:

$$50 \leq L^* \leq 80, 5 \leq a^* < 60, 5 \leq b^* < 60,$$

where $L^*$, $a^*$, and $b^*$ are numeric values determined based on the $L^*a^*b^*$ calorimetric system described in JIS Z 8729.

29 Claims, 7 Drawing Sheets

350℃

ELECTRODE CURRENT COLLECTOR AND METHOD FOR INSPECTING THE SAME, ELECTRODE FOR BATTERY AND METHOD FOR PRODUCING THE SAME, AND SECONDARY BATTERY AND METHOD FOR PRODUCING THE SAME

CROSS-REFERENCE TO RELATED APPLICATIONS

The present application contains subject matter related to Japanese Patent Application JP 2006-180216 filed in the Japanese Patent Office on Jun. 29, 2006, the entire content of which being incorporated herein by reference.

BACKGROUND OF THE INVENTION

1. Field of the Invention

The present invention relates to an electrode current collector that may be advantageously used in, e.g., lithium secondary battery, and a method for inspecting the same, an electrode for battery and a method for producing the same, and a secondary battery and a method for producing the same. More particularly, the present invention relates to the improvement of discharge capacity and charge-discharge cycle characteristics.

2. Description of Related Art

In recent years, mobile devices are being improved in performance and increased in functions, and, in accordance with this tendency, demands are made on secondary batteries used as a power source of the mobile devices, wherein the batteries should be reduced in size, weight, and thickness, and particularly should be increased in capacity.

As a secondary battery which can meet the demands, there is a lithium-ion secondary battery. The lithium-ion secondary battery has battery properties which sharply change depending on the electrode active material used and the like. In a representative lithium-ion secondary battery being practically used, lithium cobalt oxide is used as a cathode active material and graphite is used as an anode active material, and the lithium-ion secondary battery having such constituents has a battery capacity reaching the theoretical capacity, and hence it is difficult to drastically increase the battery capacity by the further improvement.

For achieving a lithium-ion secondary battery having a capacity drastically increased, studies are made on the use of silicon or tin which is capable of forming an alloy together with lithium during the charging as an anode active material. However, when silicon or tin is used as an anode active material, expansion or shrinkage caused during the charging or discharging is large, and therefore the expansion or shrinkage caused during the charging or discharging causes the active material to be finely divided or to be removed from the current collector, leading to a problem of lowering of the cycle characteristics.

On the other hand, in recent years, a negative electrode comprising an anode active material layer made of silicon or the like stacked on a negative electrode current collector has been proposed (see, for example, Japanese Patent Application Publication No. Hei 08-50922, Japanese Patent No. 2948205, and Japanese Patent Application Publication No. Hei 11-135115). This negative electrode is considered to unify the anode active material layer and the negative electrode current collector, preventing the active material from being finely divided due to the expansion or shrinkage caused during the charging or discharging. Further, there can be obtained an advantage in that the electron conduction of the negative electrode is improved.

In patent document 1 (Japanese Patent Application Publication No. 2002-83594, pages 11-13), there is a description showing that, from the viewpoint of improving the adhesion between the anode active material layer and the current collector, the current collector for negative electrode on which an anode active material layer made of silicon or the like is stacked is preferably made of a metal capable of forming an alloy together with the anode active material layer, and, when silicon and germanium layers are stacked on the current collector, the current collector for negative electrode is especially preferably made of copper. In addition, there is a description showing that an electrolytic copper foil having a large surface roughness Ra is preferred as a copper foil. The electrolytic copper foil is a copper foil obtained by, for example, immersing a drum made of a metal in an electrolytic solution having copper ions dissolved therein, and allowing an electric current to flow the electrolytic solution while rotating the drum to permit copper to be deposited on the surface of the drum, and peeling the resultant copper off the drum, and a copper foil having a surface roughened can be obtained by permitting copper fine particles to be deposited on one surface or both surfaces by an electrolytic treatment.

SUMMARY OF THE INVENTION

However, even the negative electrode having the anode active material layer unified with the negative electrode current collector formed by an improved production method may still poses an issue such that, as the cycle of charging and discharging is repeated, large expansion and shrinkage of the anode active material layer apply stresses to the current collector, so that the electrode including the current collector is deformed or destroyed, thus making it difficult to obtain satisfactory cycle characteristics.

In the patent document 1 and the like, use of a surface roughness Ra is proposed as a yardstick when judging whether the negative electrode current collector is acceptable or unacceptable (conforming or non-conforming). However, as shown in the Examples below, there are electrolytic copper foils having the same surface roughness Ra and having charge-discharge cycle characteristics totally different from each other, and thus the surface roughness Ra or ten-point averaged surface roughness Rz is not suitable for a yardstick used when judging the acceptability of the negative electrode current collector. Therefore, in practice, for judging whether the negative electrode current collector is acceptable or unacceptable, a battery has to be inevitably assembled in order to measure the charge-discharge cycle characteristics.

Accordingly, it is desirable to provide a method for inspecting an electrode current collector, which can judge the current collector acceptable (conforming) or unacceptable (non-conforming) without actually assembling a battery, an electrode current collector selected by the method, an electrode for battery comprising the electrode current collector and a method for producing the same, and a secondary battery using the electrode and a method for producing the same. The present invention is made in view of the above.

The inventors of the present invention have conducted extensive and intensive studies. As a result, they have found that color of the electrode current collector can be used as a yardstick when judging whether the current collector is acceptable or unacceptable.

In an embodiment of the present invention, there is provided a current collector forming an electrode for battery, wherein the electrode current collector is made of copper or a copper alloy, wherein the electrode current collector has a front surface color and a back surface color, at least one color of which is a color belonging to a color space represented by:

$$50 \leq L^* \leq 80, 5 \leq a^* < 60, 5 \leq b^* < 60,$$

where L*, a*, and b* are numeric values determined based on the L*a*b* calorimetric system described in JIS Z 8729. The present embodiment may be further directed to an electrode for battery having such an electrode current collector and a secondary battery having incorporated thereinto such an electrode for battery.

In another embodiment of the present invention, there is provided a method for inspecting an electrode current collector forming an electrode for battery and being made of copper or a copper alloy, wherein the method includes obtaining value(s) of the front surface color or the back surface color or both of each electrode current collector based on the L*a*b* calorimetric system described in JIS Z 8729, and selecting an electrode current collector having a color belonging to a color space represented by:

$$50 \leq L^* \leq 80, 5 \leq a^* < 60, 5 \leq b^* < 60$$

as a conforming article.

In another embodiment of the present invention, there is provided a method for producing an electrode for battery having an electrode current collector made of copper or a copper alloy, wherein the method includes obtaining value(s) of the front surface color or the back surface color or both of each electrode current collector based on the L*a*b* calorimetric system described in JIS Z 8729, selecting an electrode current collector having a color belonging to a color space represented by:

$$50 \leq L^* \leq \sim 80, 5 \leq a^* < 60, 5 \leq b^* < 60$$

as a conforming article, and producing an electrode for battery using the selected electrode current collector.

In another embodiment of the present invention, there is provided a method for producing a secondary battery comprising an electrode for battery having an electrode current collector made of copper or a copper alloy, wherein the method includes obtaining value(s) of the front surface color or the back surface color or both of each electrode current collector based on the L*a*b* calorimetric system described in JIS Z 8729, selecting an electrode current collector having a color belonging to a color space represented by:

$$50 \leq L^* \leq 80, 5 \leq a^* < 60, 5 \leq b^* < 60$$

as a conforming article, producing an electrode for battery using the selected electrode current collector, and incorporating the produced electrode into a secondary battery.

In the forgoing embodiments, the L*a*b* calorimetric system is described. Alternatively, with respect to the selection of calorimetric system, there is no particular limitation, and any calorimetric system may be used as long as the numeric values determined based on the calorimetric system can be converted to values in the L*a*b* calorimetric system.

A mechanism in which a color of the electrode current collector can be used as an excellent yardstick when judging whether the current collector acceptable or not has not yet been completely elucidated, and further studies are being made. However, the information obtained from color is the integration of spectroscopic microscopic information and optical macroscopic information including reflectance. If it is assumed that the surface state optimal for the current collector is determined collectively by a combination of microscopic properties, such as adhesion at the interface between the active material layer and the current collector, and current collection performance responsible for facilitating electron emission or reception at the interface, and macroscopic properties, such as mechanical strength, surface roughness, and electrical conduction properties, a color of the current collector can be a yardstick (parameter) which is capable of collectively reflecting the surface state of the current collector. Particularly, from the fact that the surface roughness, which has been used as a yardstick in the related art, reflects only the macroscopic properties and does not reflect the microscopic properties, the conclusion that the color information reflecting also the microscopic surface state is a more excellent yardstick than the surface roughness is more reasonable.

Apart from the mechanism, in the method for inspecting an electrode current collector of the embodiment of the present invention, the electrode current collector can be judged acceptable or unacceptable by simple spectrocolorimetry without actually assembling a battery to measure charge-discharge cycle characteristics. Therefore, the quality control in the production process for the electrode current collector is dramatically improved inefficiency, thus making it possible to remarkably improve the production yield and productivity of the electrode current collector.

The electrode current collector of the embodiment is selected by the above method and therefore, the electrode for battery of the embodiment including the selected electrode current collector and the secondary battery of the embodiment having incorporated thereinto the electrode for battery as an electrode achieve both excellent initial discharge capacity and excellent charge-discharge cycle characteristics. Further, the method for producing an electrode for battery of the embodiment and the method for producing a secondary battery of the embodiment are based on the method for inspecting an electrode current collector of the embodiment, and hence have the similar characteristic effect.

DETAILED DESCRIPTION OF EMBODIMENTS

Figure 1A:
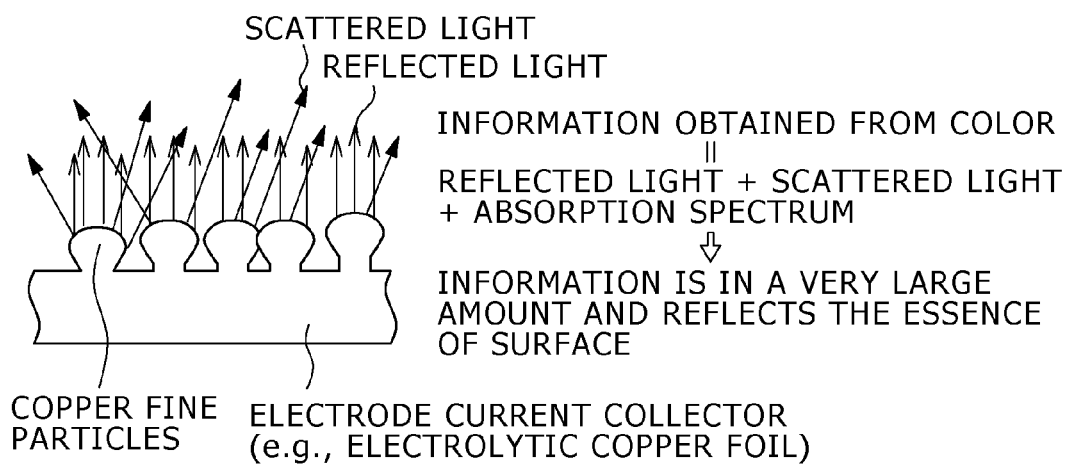
FIG. 1A is an explanatory view illustrating the characteristic feature of the method for inspecting an electrode current collector according to an embodiment of the present invention.

In the electrode current collector according to an embodiment of the present invention, either the front surface color or the back surface color or both is preferably a color belonging to a color space represented by:

$$50 \leq L^* \leq 80, 20 \leq a^* \leq 40, 15 \leq b^* \leq 30,$$

further preferably a color belonging to a color space represented by:

$$55 \leq L^* \leq 65, 22 \leq a^* \leq 30, 17 \leq b^* \leq 22,$$

where $L^*$, $a^*$, and $b^*$ are numeric values determined based on the $L^*a^*b^*$ calorimetric system.

When both the front surface and the back surface are used, each of the front surface color and the back surface color is preferably a color such that at least one of the $L^*$, $a^*$, and $b^*$ numeric values determined based on the $L^*a^*b^*$ calorimetric system is different from another. The reason for this is not clear, but it is presumed that the stresses caused during the charging or discharging are relaxed in such a case.

The current collector preferably has a front surface and a back surface, at least one surface of which is roughened by fine particles made of copper or a copper alloy fixed to at least one surface of the front surface and the back surface. In this case, the current collector is preferably made of an electrolytic copper foil, wherein the fine particles are formed by an electrolytic treatment. In such a case, the fine particles unify with the crystallites of the current collector and are strongly fixed to them, and therefore there can be obtained stronger adhesion between the current collector and an active material layer formed in contact with the fine particles on the front surface and/or back surface of the current collector.

The electrolytic copper foil is preferably an electrolytic copper foil having a diffraction peak intensity ratio of copper in an X-ray diffraction measurement wherein the peak intensity ratio satisfies the relationship: $I(220)/I(111) \leq 1$, wherein the electrolytic copper foil has a front surface and a back surface each roughened by an electrolytic treatment, and has a ten-point average surface roughness Rz on the front surface side of $2.0 \, \mu m \leq Rz \leq 4.5 \, \mu m$ and a ten-point average surface roughness Rz on the back surface side of $2.5 \, \mu m \leq Rz \leq 5.5 \, \mu m$, as measured in accordance with JIS B0601, wherein the front surface color is a color belonging to a color space represented by:

$$45 \leq L^* \leq 65, 20 \leq a^* \leq 30, 15 \leq b^* \leq 25,$$

and the back surface color is a color belonging to a color space represented by:

$$50 \leq L^* \leq 70, 20 \leq a^* \leq 30, 15 \leq b^* \leq 25,$$

where $L^*$, $a^*$, and $b^*$ are numeric values determined based on the $L^*a^*b^*$ calorimetric system.

The front surface and the back surface respectively correspond to, for example, a matte surface and a shine surface of the electrolytic copper foil. When a drum made of a metal is immersed in an electrolytic solution having copper ions dissolved therein and an electric current is allowed to flow the electrolytic solution while rotating the drum to permit an electrolytic copper foil to be deposited on the surface of the electrolytic drum, the surface of the resultant electrolytic copper foil in contact with the electrolytic solution is a matte surface and the surface of the electrolytic copper foil formed in contact with the electrolytic drum is a shine surface. In the roughened surface obtained by permitting copper fine particles to be deposited by an electrolytic treatment, on the matte surface, the copper fine particles are randomly arranged, where as, on the shine surface, the unevenness in a line form of the surface of the electrolytic drum is transferred to the copper foil so that the copper fine particles are arranged in lines in a predetermined direction.

In this case, it is more preferred that the electrode current collector has a ten-point average surface roughness Rz on the front surface side of $2.8 \, \mu m \leq Rz \leq 3.5 \, \mu m$ and a ten-point average surface roughness Rz on the back surface side of $4.2 \, \mu m \leq Rz \leq 5.2 \, \mu m$, and has a surface roughness Ra on the front surface side of $0.50 \, \mu m \leq Ra \leq 0.65 \, \mu m$ and a surface roughness Ra on the back surface side of $0.80 \, \mu m \leq Ra \leq 0.95 \, \mu m$, as measured in accordance with JIS B0601, or that the front surface color is a color belonging to a color space represented by:

$$50 \leq L^* \leq 60, 25.5 \leq a^* \leq 29, 19 \leq b^* \leq 21,$$

and the back surface color is a color belonging to a color space represented by:

$$55 \leq L^* \leq 70, 23 \leq a^* \leq 28, 17.5 \leq b^* \leq 21.5,$$

where $L^*$, $a^*$, and $b^*$ are numeric values determined based on the $L^*a^*b^*$ calorimetric system.

The electrolytic copper foil preferably has a cross-section made of a plurality of crystallites, wherein each of the crystallites has a cross-section area of $100 \, \mu m^2$ or less.

The electrolytic copper foil preferably has a surface area ratio R on the front surface side of $1.5 \leq R \leq 5.5$ and a surface area ratio R on the back surface side of $2.0 \leq R \leq 6.0$, wherein the surface area ratio R is defined by the following formula:

Surface area ratio R=Correction surface area/Geometrical surface area of both surfaces where:
Correction surface area=BET surface area−(Sum of geometrical surface area of top/bottom faces and geometrical surface area of side of a test specimen).

The electrolytic copper foil preferably has a thickness of 10 to 25 μm, an elongation of 1 to 10%, and a Young's modulus of $5.0 \times 10^7$ to $5.0 \times 10^9$ MPa.

The electrolytic copper foil is preferably an electrolytic copper foil rated (2) very slightly transferred or (3) slightly transferred, in accordance with the "transfer test for roughened surface of copper foil" described in IPC (IPC-No. 2.4.1.5).

The electrolytic copper foil is preferably treated by heating.

The electrode for battery according to an embodiment of the present invention has an active material layer containing at least one substance selected from the group consisting of metallic lithium, metallic tin, a tin compound, a silicon simple substance, and a silicon compound.

In this case, it is preferred that, in at least part of the interface region between the electrode current collector and the active material layer, a region in which the constituent of the electrode current collector and the constituent of the active material layer diffuse into each other is present, and the active material layer is especially preferably made of silicon. In such a case, there can be achieved stronger adhesion between the electrode current collector and the active material layer.

The active material layer made of silicon preferably contains oxygen as a constituent element in an amount of 3 to 40 atomic %. In this case, the active material layer preferably has a region having a high oxygen content and being distributed in substantially the longitudinal direction of the electrode current collector.

The secondary battery according to an embodiment of the present invention is a lithium secondary battery. In this case, the secondary battery preferably includes a solvent for electrolyte made of a cyclic carbonate having an unsaturated bond, e.g., vinylene carbonate or vinylethylene carbonate. Further, the secondary battery preferably includes a solvent for electrolyte made of a fluorine compound obtained by fluorinating part of or all of hydrogens of at least one carbonate selected from a cyclic carbonate and a chain carbonate, e.g., difluoroethylene carbonate.

The secondary battery preferably includes an electrolyte containing a sultone. In this case, the sultone is further preferably 1,3-propenesultone. Thus, a side reaction caused during the charging or discharging is suppressed, preventing lowering of the cycle characteristics due to the deformation of the battery form caused by gas expansion or the like.

The secondary battery preferably includes an electrolyte made of a compound containing boron and fluorine.

Hereinbelow, the embodiments of the present invention will be described in detail with reference to the accompanying drawings.

In the present embodiment, an example is described in which an electrode current collector made of, e.g., an electrolytic copper foil is selected by the method for inspecting an electrode current collector of the present invention and a lithium-ion secondary battery is produced using an electrode for battery including the selected electrode current collector as a negative electrode.

FIG. 1A is an explanatory view illustrating the characteristic feature of the method for inspecting an electrode current collector according to an embodiment of the present invention. The characteristic feature of this method resides in that a color of the electrode current collector is determined by a spectroscopic surface measurement and used as a yardstick when judging whether the current collector acceptable or not.

Typically, a ray of light striking the surface of an object is partially absorbed by the object and the remaining light is reflected or scattered. Incident light includes lights having different wavelengths, and, when all lights having different wavelengths are equally absorbed and reflected or scattered, the object has a white, gray, or black color. When the object selectively absorbs a light having a specific wavelength region, the object has a specific color (hue). The wavelength of light which the object selectively absorbs (absorption spectrum) is determined mainly by the type of the element constituting the surface of the object or the oxidation state or bonding state of the element. Therefore, the color (hue) of the object includes information about the type of the element constituting the surface of the object or the oxidation state or bonding state of the element, and is considered to reflect the essence of the microscopic surface state of the object.

Further, the amount of the light reflected or scattered by the surface of the object reflects the macroscopic surface state of the object including the surface roughness and electrical conduction properties. Therefore, the measurement of brightness makes it possible to know the macroscopic surface state of the object.

Figure 1B:
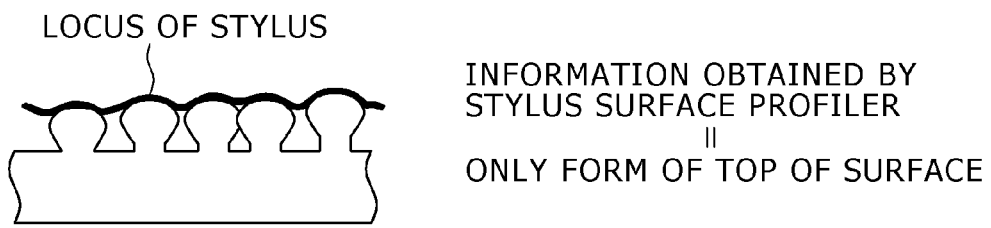
FIGS. 1B and 1C are explanatory views illustrating the information obtained by a stylus surface profiler and optical surface profiler of related art.
Figure 1C:
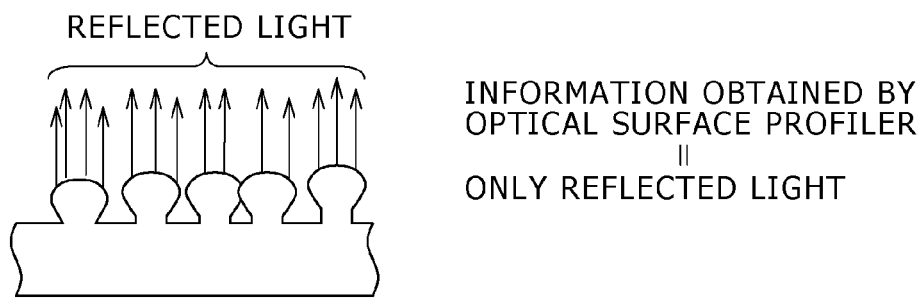

FIG. 1B is an explanatory view illustrating the information obtained by a stylus surface profiler of the related art. The information obtained by the stylus surface profiler is merely the locus of the stylus tip, namely, only the uneven form of the top of surface. FIG. 1C is an explanatory view illustrating the information obtained by an optical surface profiler of the related art. By the optical surface profiler, merely a reflectance is obtained, and spectroscopic information cannot be obtained. Therefore, the macroscopic surface state can be known by the improvement of the measurement, but the microscopic surface state cannot be grasped.

Figure 2A:
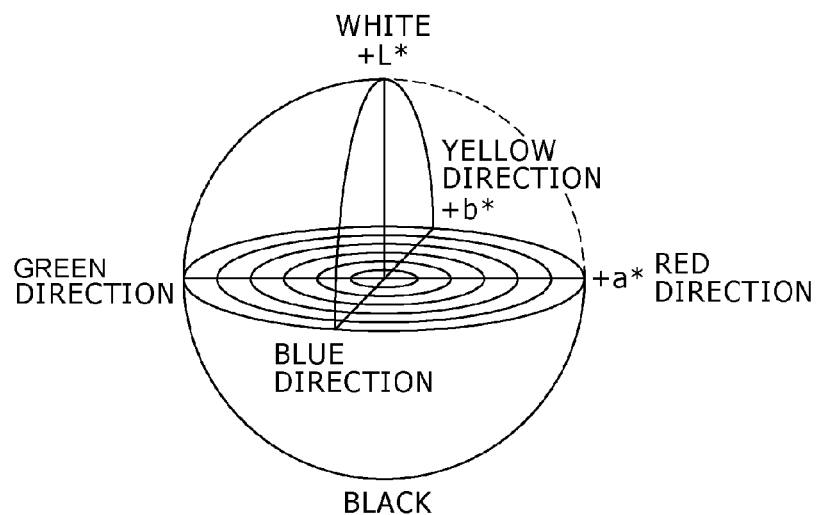
FIGS. 2A and 2B are explanatory views illustrating the L*a*b* calorimetric system in an embodiment of the present invention.
Figure 2B:
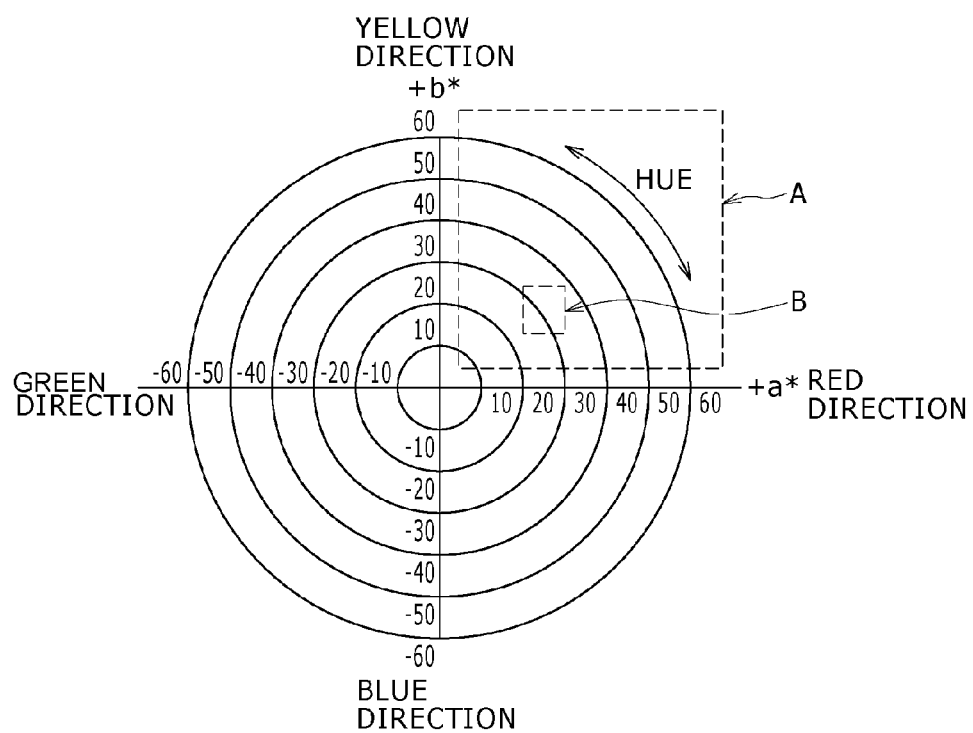

A color of an object generally includes three factors, i.e., brightness (lightness), hue (color shade), and chroma (clearness). For accurately measuring and expressing these factors, a calorimetric system to objectively express them as values is needed. FIGS. 2A and 2B are explanatory views illustrating the L*a*b* colorimetric system used in the present embodiment. The L*a*b* colorimetric system is a colorimetric system described in JIS Z 8729, and assigns each color to a position in a spherical color space as shown in FIG. 2A. In this color space, the brightness is represented by a position in the ordinate (z-axis) direction, the hue is represented by a position in the circumferential direction, and the chroma is represented by a distance from the center axis.

The position on the ordinate (z-axis) representing brightness is designated by L*, and the L* value changes from 0 corresponding to black to 100 corresponding to white. FIG. 2B is a cross-sectional view of the spherical color space horizontally taken along the plane of L*=50. As shown in FIG. 2B, the positive direction of the x-axis corresponds to a red direction, the positive direction of the y-axis corresponds to a yellow direction, the negative direction of the x-axis corresponds to a green direction, the negative direction of the y-axis corresponds to a blue direction, and the position on the x-axis is designated by a* of which value changes from −60 to +60 and the position on the y-axis is designated by b* of which value changes from −60 to +60. The hue and chroma are represented by a* value and b* value, respectively. For example, the hue and chroma of the current collector of the present embodiment, namely:

$$5 \leq a^* < 60, 5 \leq b^* < 60 (50 \leq L^* \leq 80),$$

and the hue and chroma of the preferred current collector, namely:

$$20 \leq a^* \leq 30, 15 \leq b^* \leq 25 \ (45 \leq L^* \leq 65 \text{ or } 50 \leq L^* \leq 70)$$

occupy, respectively, regions A and B indicated by dotted lines on the plane of L=50 shown in FIG. 2B.

Figure 3A:
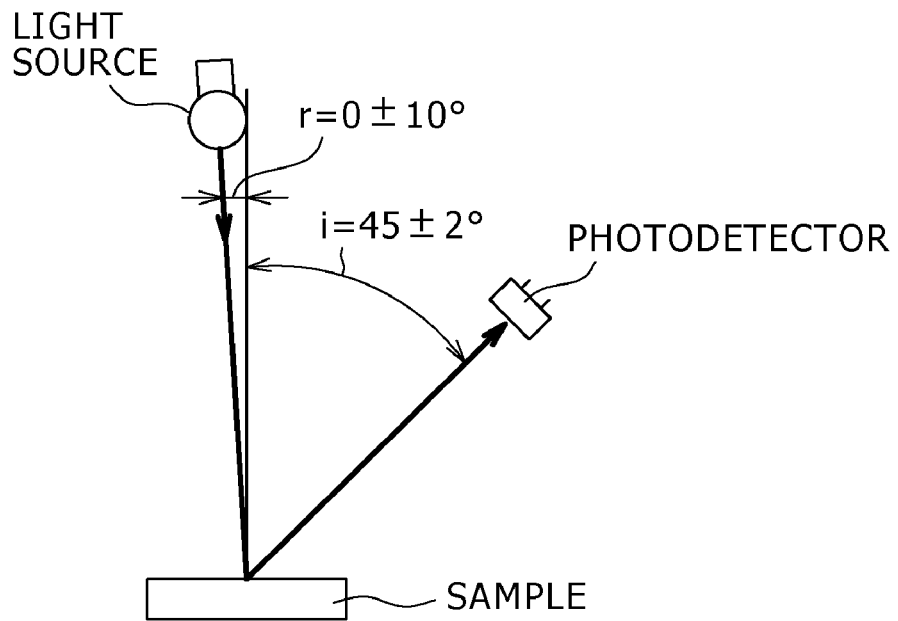
FIGS. 3A and 3B are explanatory views showing how to measure L*, a*, and b* in an embodiment of the present invention.
Figure 3B:
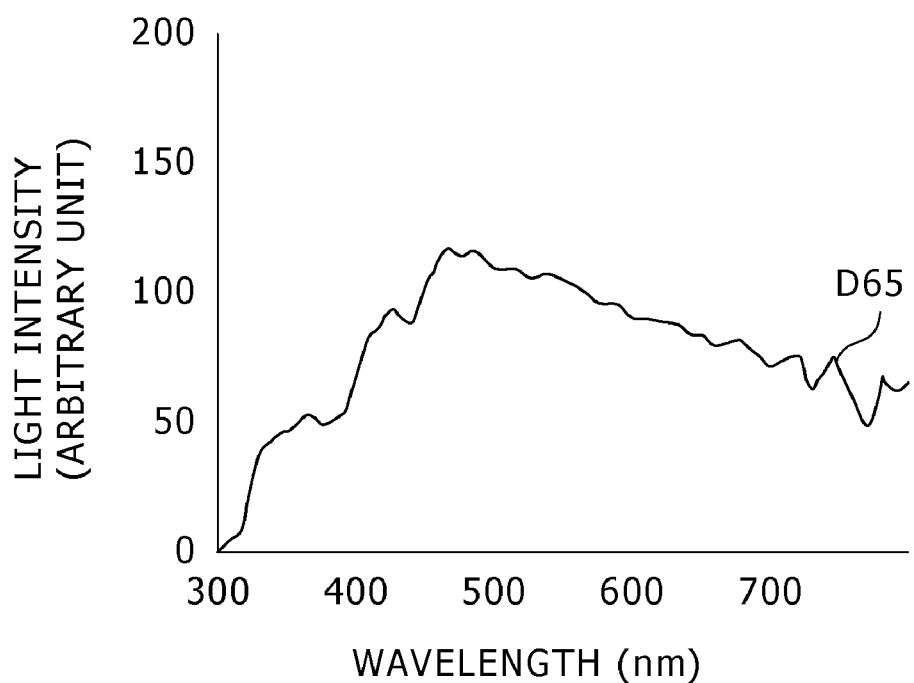

FIGS. 3A and 3B are explanatory views showing how to measure L*, a*, and b* using a spectrocolorimeter according to an embodiment of the present invention. As shown in FIG. 3A, a light source was placed at a certain position on the normal to the surface of a sample to be measured, and a light scattered in the direction at an angle of 45° to the normal was measured by a photodetector. As a light source, D65 (color temperature: 6,504 K), which is an ISO reference illuminant, was used. FIG. 3B is a graph showing an emission spectrum of the D65 light source.

In the present embodiment, a front surface color and/or back surface color of an electrode current collector is measured using a spectrocolorimeter by the method show in FIGS. 3A and 3B, and an acceptable electrode current collector is selected according to the values for color obtained in accordance with L*a*b* colorimetric system. Subsequently, in accordance with a related art method, an electrode for battery including the selected electrode current collector is prepared, and a lithium-ion secondary battery is produced using the prepared electrode as a negative electrode.

With respect to the structure or type of the secondary battery according to the present embodiment, there is no particular limitation, and the secondary battery may be of a stack type including a negative electrode and a positive electrode stacked through a separator, or a spirally wound type including a continuous electrode and a separator spirally wound together. With respect to the form of the secondary battery, there is no particular limitation, and the secondary battery may be of a cylinder type widely used in laptop personal computer (PC) and the like, a rectangle type (rectangular cylinder type) used in portable phone, a button type, or a coin type. As a packaging material for the secondary battery, a typical aluminum can, stainless steel can, laminated film, or others can be used.

Figure 4:
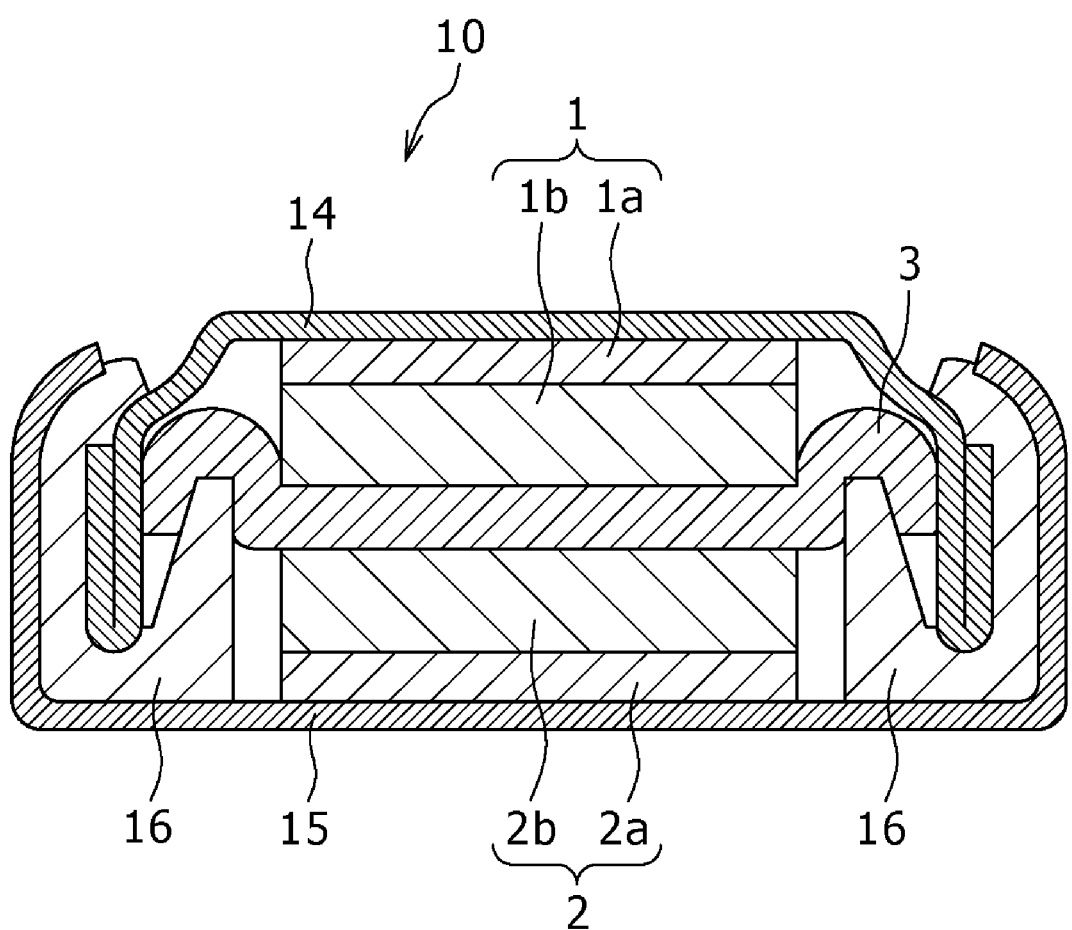
FIG. 4 is across-sectional view showing one example (coin type) of the construction of a lithium-ion secondary battery according to an embodiment of the present invention.

FIG. 4 is a cross-sectional view showing one example of the construction of a lithium-ion secondary battery according to an embodiment of the present invention. The secondary battery 10 is of a so-called coin type, and includes a negative electrode 1 contained in a packaging cup 14 and a positive electrode 2 contained in a packaging can 15, which are stacked through a separator 3. The edges of the packaging cup 14 and packaging can 15 are caulked through an insulating gasket 16 to close the battery. Each of the packaging cup 14 and the packaging can 15 is made of a metal, such as stainless steel or aluminum (Al).

Figure 5:
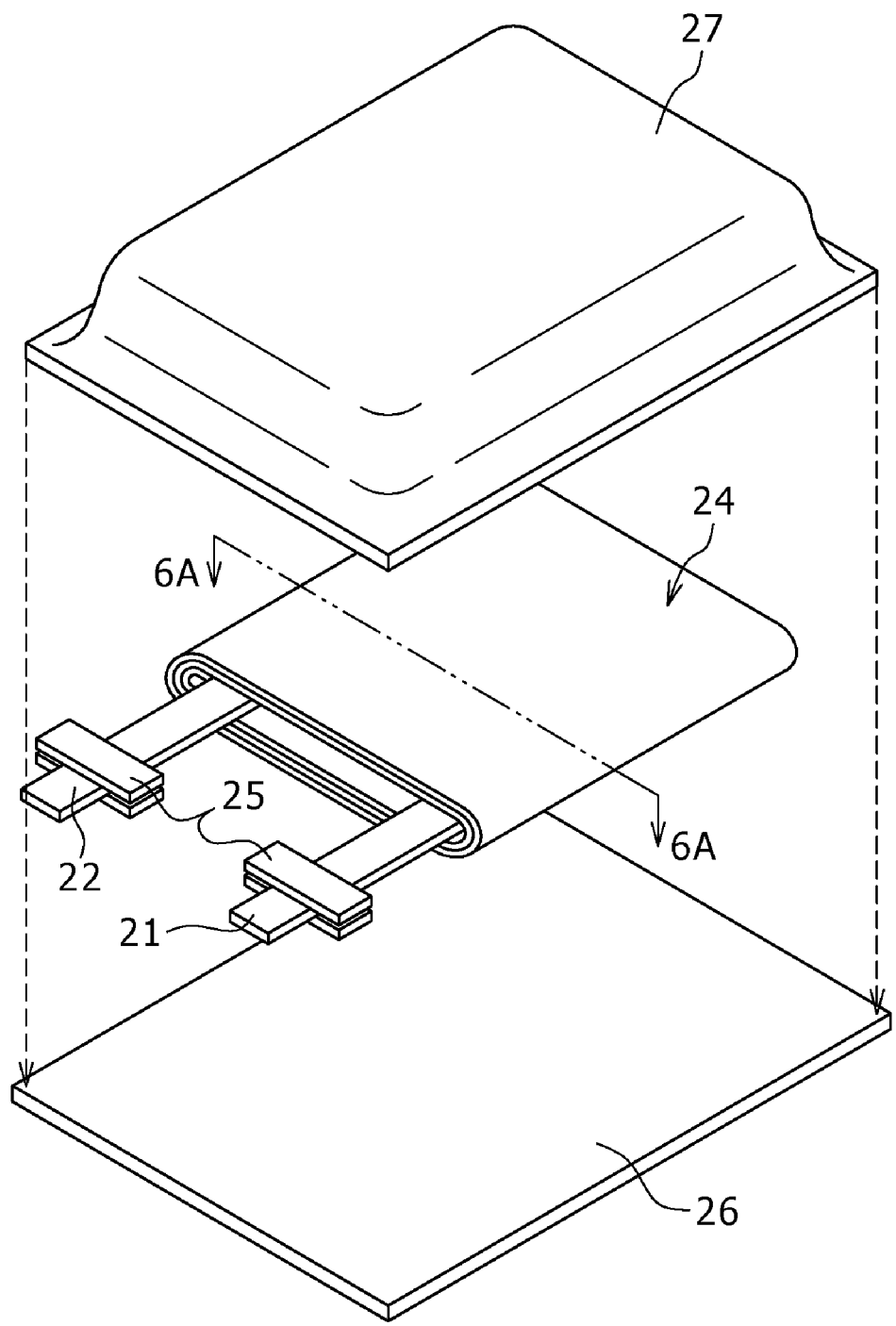
FIG. 5 is an exploded perspective view showing another example (laminate type) of the construction of a lithium-ion secondary battery according to an embodiment of the present invention.

FIG. 5 is an exploded perspective view showing another construction of a lithium-ion secondary battery according to the present embodiment. As shown in FIG. 5, the secondary battery 20 is a battery of a laminate type, and includes a spirally-wound electrode structure 24 having fitted thereto a negative electrode lead terminal 21 and a positive electrode lead terminal 22, and being contained in packaging cases made of film packaging members 26 and 27, and can be reduced in size, weight, and thickness.

The negative electrode lead terminal 21 and positive electrode lead terminal 22 are individually electrically introduced from the inside of the packaging members 26 and 27 to the outside, for example, in the same direction. Each of the lead terminals 21 and 22 is formed from a metal material, such as aluminum (Al), copper (Cu), nickel (Ni), or stainless steel, and shaped into a thin plate form or a mesh form.

Each of the packaging members 26 and 27 is made of, for example, an aluminum laminated film including a nylon film, an aluminum foil, and a polyethylene film, which are laminated in this order. The packaging member 26 is shaped into a rectangular form, and the packaging member 27 is shaped into a form having a cross-section of shallow reverse trapezoid and having formed an outer edge portion. The packaging member 26 and the packaging member 27 are sealed together at their outer edge portions or bonded together using an adhesive to form a packaging case. The packaging members 26 and 27 are arranged so that, for example, the polyethylene film side faces the spirally-wound electrode structure 24.

A contact film 25 for preventing outer air from going into the battery is disposed between the packaging members 26 and 27 and the lead terminals 21 and 22. The contact film 25 is made of a material having adhesion to the lead terminals 21 and 22, e.g., a polyolefin resin, such as polyethylene, polypropylene, modified polyethylene, or modified polypropylene.

Each of the packaging members 26 and 27 may be made of, instead of the aluminum laminated film, a laminated film having another structure, a polymer film made of polypropylene or the like, or a metal film.

Figure 6:
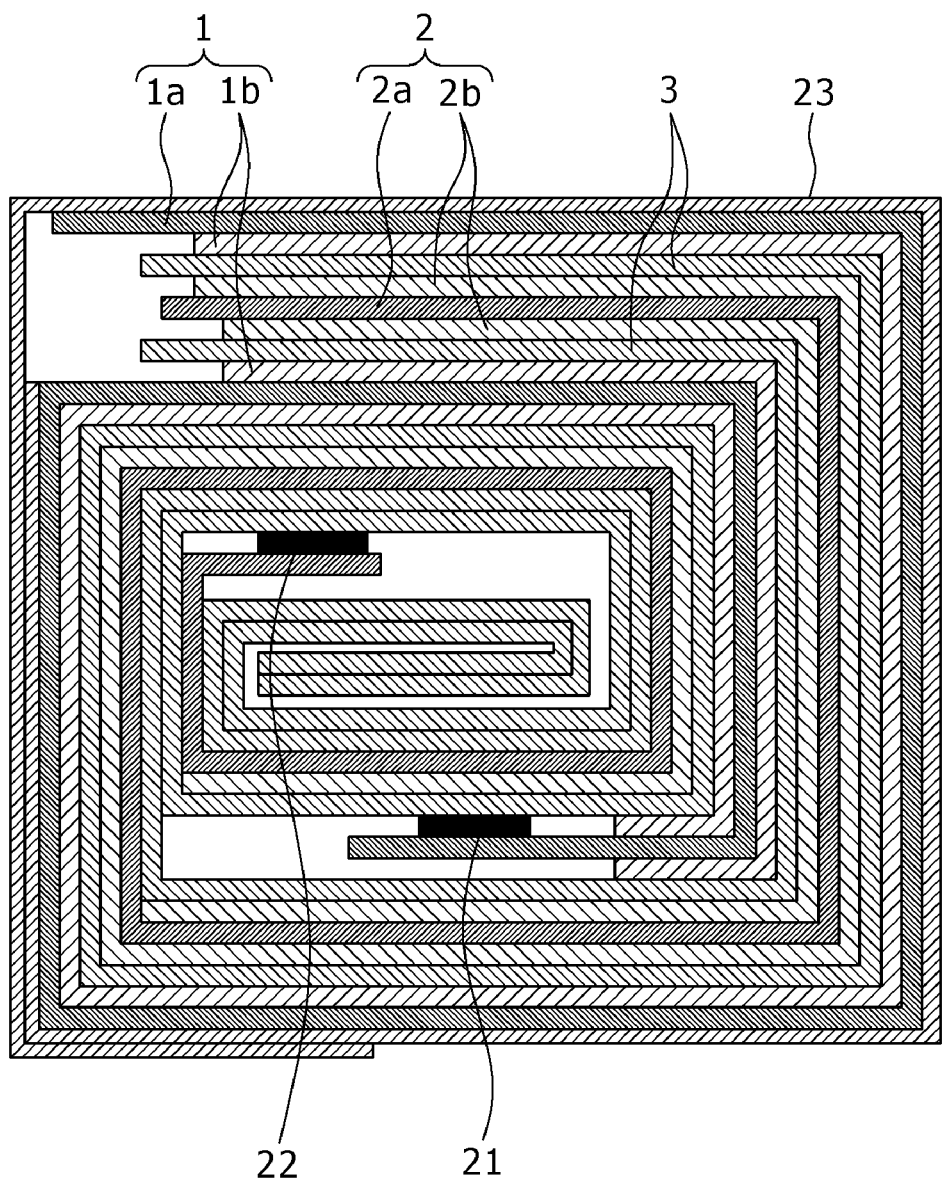
FIG. 6 is a cross-sectional view showing the cross-section of a spirally-wound electrode structure in an embodiment of the present invention, taken along the line 6A-6A in FIG. 5.

FIG. 6 shows the cross-section of the spirally-wound electrode structure 24, taken along the line 6A-6A in FIG. 5. The spirally-wound electrode structure 24 includes the negative electrode 1, the positive electrode 2, and the separator (and the electrolyte layer) 3 disposed between them, which are stacked on one another and together spirally wound, and the outermost layer of the electrode structure is protected by a protective tape 23.

The constituent members of the lithium-ion secondary battery are the same as those of a lithium-ion secondary battery of the related art, except for the surface structure of the negative electrode current collector 1a, but they are described below in detail.

The negative electrode 1 includes a negative electrode current collector 1a, and an anode active material layer 1b formed on the negative electrode current collector 1a.

The negative electrode current collector 1a is preferably formed from a metal material which does not form an intermetallic compound together with lithium (Li). When the negative electrode current collector 1a is formed from a material which forms an intermetallic compound together with lithium, a reaction of the material with lithium advanced during the charging or discharging causes the negative electrode current collector 1a to undergo expansion or shrinkage. Consequently, the negative electrode current collector 1a suffers structure breakage, lowering the current collection properties. Further, the ability of the current collector to bond with the anode active material layer 1b becomes poor, so that the anode active material layer 1b is likely to be removed from the negative electrode current collector 1a.

Examples of metal elements which do not form an intermetallic compound together with lithium include copper (Cu), nickel (Ni), titanium (Ti), iron (Fe), and chromium (Cr). In the present specification, the metal material involves a single substance of a metal element and an alloy of two or more metal elements or at least one metal element and at least one semi-metal element.

The negative electrode current collector 1a is preferably made of a metal material including a metal element capable of forming an alloy together with the anode active material layer 1b. In this case, the formation of an alloy improves the adhesion between the anode active material layer 1b and the negative electrode current collector 1a, and hence the anode active material is prevented from being finely divided due to the expansion or shrinkage caused during the charging or discharging, thus preventing the anode active material layer 1b from being removed from the negative electrode current collector 1a. In addition, there can be obtained an advantage in that the electron conduction of the negative electrode 1 is improved.

The negative electrode current collector 1a may be made of either a single layer or a plurality of layers. When the negative electrode current collector is made of a plurality of layers, it is preferred that the layer in contact with the anode active material layer 1b is made of a metal material capable of forming an alloy together with silicon and the other layer(s) is (are) made of a metal material which does not form an intermetallic compound together with lithium.

The surface of the negative electrode current collector 1a on which the anode active material layer 1b will be formed is preferably roughened. The negative electrode current collector 1a is preferably made of, for example, an electrolytic copper foil obtained by forming a number of copper fine particles, which are a number of bulk protrusions, by an electrolytic treatment so as to cover almost all the surface of an untreated copper foil.

The anode active material layer 1b contains as an anode active material at least one member selected from a simple substance of silicon and a compound thereof, and a simple substance of tin and a compound thereof, and especially preferably contains silicon. Silicon has both excellent ability to form an alloy together with lithium ions and excellent ability to extract lithium ions from the alloyed lithium, and, when silicon is used for forming a lithium-ion secondary battery, a secondary battery having a large energy density can be achieved. Silicon may be contained in any form of a simple substance, an alloy, a compound, and a mixture thereof.

The anode active material layer 1b may be either of a coating type having a thickness of about 70 to 80 μm or of a thin film type having a thickness of about 5 to 6 μm.

The anode active material layer 1b of a coating type is formed, on the negative electrode current collector 1a, from fine particles of an anode active material made of at least one member selected from a simple substance of silicon and a compound thereof, and a simple substance of tin and a compound thereof, and optionally a conductor, such as a carbon material, and a binder, such as polyimide or polyvinyl fluoride.

The anode active material layer 1b of a thin film type is formed, on the negative electrode current collector 1a, from an anode active material layer 1b made of at least one member selected from a simple substance of silicon and a compound thereof, and a simple substance of tin and a compound thereof.

In this case, part of or all of the simple substance of silicon or tin and the negative electrode current collector 1a constituting the negative electrode 1 preferably together form an alloy. In such a case, the adhesion between the anode active material layer 1b and the negative electrode current collector 1a can be improved as mentioned above. Specifically, it is preferred that, at the interface, the constituent element of the negative electrode current collector 1a diffuses into the anode active material layer 1b, the constituent element of the anode active material layer 1b diffuses into the negative electrode current collector 1a, or these elements diffuse into each other. In this case, even when the anode active material layer 1b undergoes expansion or shrinkage due to the charging or discharging, the anode active material layer is prevented from being removed from the negative electrode current collector 1a. In the present embodiment, the diffusion of the elements is included in the alloying as one mode.

When the anode active material layer 1b contains a simple substance of tin, a cobalt layer is stacked on the tin layer and the stacked layers may be subjected to heating so that they together form an alloy. In this case, the charging-discharging efficiency is increased, thus improving the cycle characteristics. The reason for this is not clear, but it is presumed that, by virtue of containing cobalt which does not react to lithium, the tin layer is improved in structure stability during the repeated charge-discharge reaction.

When the anode active material layer 1b contains a simple substance of silicon, as examples of metal elements which do not form an intermetallic compound together with lithium and which form an alloy together with the silicon contained in the anode active material layer 1b, there can be mentioned copper, nickel, and iron. Of these, copper is especially preferably used as a material since the negative electrode current collector 1a having satisfactory strength and electrical conduction properties can be obtained.

The anode active material layer 1b preferably contains oxygen as a constituent element. Oxygen can suppress expansion and shrinkage of the anode active material layer 1b and prevent the lowering of the discharge capacity and the expansion. It is preferred that at least part of the oxygen contained in the anode active material layer 1b is bonded to silicon, and the silicon bonded may be present in the form of silicon monoxide or silicon dioxide or in another metastable state.

It is preferred that the oxygen content of the anode active material layer 1b is in the range of from 3 to 45 atomic %. When the oxygen content is less than 3 atomic %, the effect aimed at by adding oxygen to the layer cannot be obtained. On the other hand, when the oxygen content is more than 45 atomic %, it is considered that the energy capacity of the battery is lowered, and further the resistance of the anode active material layer 1b is increased, so that local insertion of lithium causes expansion or the cycle characteristics become poor. A film formed on the surface of the anode active material layer 1b due to decomposition of the electrolytic solution and the like during the charging or discharging is not included in the anode active material layer 1b. Therefore, the oxygen content of the anode active material layer 1b is a value determined by calculation excluding this film.

It is preferred that the anode active material layer 1b is formed by alternately stacking a first layer having a smaller oxygen content and a second layer having an oxygen content larger than that of the first layer, and at least one second layer is preferably present between the first layers. In this case, the occurrence of expansion or shrinkage caused during the charging or discharging can be prevented more effectively. For example, in the first layer, the silicon content is preferably 90 atomic % or more, and oxygen may be either contained or not contained, but the oxygen content is preferably smaller, and it is more preferred that no oxygen is contained or the oxygen content is very slight. In this case, a higher discharge capacity can be obtained. On the other hand, in the second layer, it is preferred that the silicon content is 90 atomic % or less and the oxygen content is 10 atomic % or more. In this case, structure breakage caused due to the expansion or shrinkage can be prevented more effectively. The first layer and the second layer may be stacked either in the order of first layer and second layer or in the order of second layer and first layer from the side of the negative electrode current collector 1a, and either the first layer or the second layer may constitute the surface. Further, it is preferred that the oxygen content changes stepwise or continuously between the first layer and the second layer. When the oxygen content suddenly changes, the diffusion of lithium ions may be poor, thus increasing the resistance.

The anode active material layer 1b may contain at least one constituent element other than silicon and oxygen. Examples of such elements include cobalt (Co), iron (Fe), tin (Sn), nickel (Ni), copper (Cu), manganese (Mn), zinc (Zn), indium (In), silver (Ag), titanium (Ti), germanium (Ge), bismuth (Bi), antimony (Sb), and chromium (Cr).

The positive electrode 2 includes a positive electrode current collector 2a, and a cathode active material layer 2b formed on the positive electrode current collector 2a.

The positive electrode current collector 2a is preferably made of a metal material, such as aluminum, nickel, or stainless steel.

The cathode active material layer 2b preferably contains, for example, as a cathode active material, at least one material which is capable of extracting lithium ions during the charging and re-occluding lithium ions during the discharging, and optionally a conductor, such as a carbon material, and a binder, such as polyvinylidene fluoride.

As a material capable of extracting and re-occluding lithium ions, preferred is a lithium-transition metal compound oxide including lithium and a transition metal element M, and being represented by, e.g., the general formula: $Li_xMO_2$. When the lithium-transition metal compound oxide is used in a lithium-ion secondary battery, the oxide can generate high electromotive force, and has a high density and hence can further increase the capacity of the secondary battery. In the above formula, M represents at least one transition metal element, preferably, e.g., at least one element selected from cobalt and nickel, and x varies depending on the charged state (or discharged state) of the battery, and is generally a value in the range of $0.05 \leq x \leq 1.10$. Specific examples of the lithium-transition metal compound oxides include $LiCoO_2$ and $LiNiO_2$.

When a particulate lithium-transition metal compound oxide is used as a cathode active material, either the powder may be used as it is, or at least part of the particulate lithium-transition metal compound oxide may have formed a surface layer including at least one member selected from the group consisting of an oxide having a composition different from that of the lithium-transition metal compound oxide, a halide, a phosphate, and a sulfate. In the latter case, the stability can be improved, making it possible to more surely suppress the lowering of the discharge capacity. In this case, the constituent element of the surface layer and the constituent element of the lithium-transition metal compound oxide may diffuse into each other.

The cathode active material layer 2b preferably contains at least one member selected from the group consisting of a simple substance and a compound of an element belonging to Group 2, Group 3, or Group 4 of the long-form periodic table. In this case, the stability can be improved, making it possible to more surely suppress the lowering of the discharge capacity. Examples of the elements belonging to Group 2 include magnesium (Mg), calcium (Ca), and strontium (Sr), and especially preferred is magnesium. Examples of the elements belonging to Group 3 include scandium (Sc) and yttrium (Y), and especially preferred is yttrium. Examples of the elements belonging to Group 4 include titanium and zirconium (Zr), and especially preferred is zirconium. The above element may be present either in the form of a solid solution in the cathode active material or in the form of a simple substance or compound at the grain boundary of the cathode active material.

The separator 3 separates the negative electrode 1 from the positive electrode 2 and prevents short-circuiting of current caused due to the contact of these electrodes, and permits lithium ions to pass through it. As a material for the separator 3, preferred is, for example, a thin membrane of microporous polyethylene or polypropylene having formed therein a number of micropores.

The electrolytic solution includes, for example, a solvent and an electrolyte salt dissolved in the solvent, and may contain an additive if necessary.

Examples of solvents used in the electrolytic solution include non-aqueous solvents, e.g., cyclic carbonates, such as 1,3-dioxolan-2-one (ethylene carbonate; EC) and 4-methyl-1,3-dioxolan-2-one (propylene carbonate; PC), and chain carbonates, such as dimethyl carbonate (DMC), diethyl carbonate (DEC), and ethylmethyl carbonate (EMC). These solvents may be used individually, but the two solvents or more are preferably used in combination. For example, when a high-permittivity solvent, such as ethylene carbonate or propylene carbonate, and a low-viscosity solvent, such as dimethyl carbonate, diethyl carbonate, or ethylmethyl carbonate, are used in combination, high dissolving power for an electrolyte salt and high ion conduction can be achieved.

The solvent may contain sultone. In this case, the electrolytic solution is improved in stability, making it possible to prevent the battery from suffering expansion due to the decomposition reaction. As the sultone, one having an unsaturated bond in its ring is preferred, and 1,3-propenesultone represented by the formula (1) below is especially preferred. This sultone exhibits more remarkable effect.

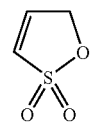

(1)

It is preferred that a cyclic carbonate having an unsaturated bond, such as 1,3-dioxol-2-one (vinylene carbonate; VC) or 4-vinyl-1,3-dioxolan-2-one (VEC), is mixed into the solvent. In this case, the lowering of the discharge capacity can be more surely suppressed. It is especially preferred that VC and VEC are used in combination since more remarkable effect can be obtained.

Further, a carbonate derivative having a halogen atom may be mixed into the solvent. In such a case, the lowering of the discharge capacity can be suppressed. In this case, it is more preferred that the carbonate derivative having a halogen atom and a cyclic carbonate having an unsaturated bond are used in combination. In such a case, more remarkable effect can be obtained. The carbonate derivative having a halogen atom may be either a cyclic compound or a chain compound, but preferred is a cyclic compound which exhibits more remarkable effect. Examples of such cyclic compounds include 4-fluoro-1,3-dioxolan-2-one (FEC), 4-chloro-1,3-dioxolan-2-one, 4-bromo-1,3-dioxolan-2-one, and 4,5-difluoro-1,3-dioxolan-2-one (DFEC), and, of these, preferred is DFEC or FEC having a fluorine atom, and especially preferred is DFEC which exhibits more remarkable effect.

Examples of electrolyte salts contained in the electrolytic solution include lithium salts, such as lithium hexa fluorophosphate ($LiPF_6$) and lithium tetra fluoroborate ($LiBF_4$). These electrolyte salts may be used individually or in combination.

The electrolytic solution may be either used as it is or used in the form of a so-called gel electrolyte which is made of a polymer compound having the electrolytic solution. In the latter case, the separator 3 may be impregnated with the electrolyte, or the electrolyte may be present in the form of a layer disposed between the separator 3 and the negative electrode 1 or positive electrode 2. As the polymer material, preferred is, for example, a polymer containing vinylidene fluoride, which has high oxidation-reduction stability. As the polymer compound, preferred is a compound formed by polymerization of a polymerizable compound. Examples of polymerizable compounds include monofunctional acrylates, such as an acrylate; monofunctional methacrylates, such as a methacrylate; polyfunctional acrylates, such as a diacrylate and a triacrylate; polyfunctional methacrylates, such as a dimethacrylate and a trimethacrylate; acrylonitrile; and methacrylonitrile, and, of these, preferred is an ester having an acrylate group or a methacrylate group, which easily undergoes polymerization and has high polymerizable compound reactivity.

The lithium-ion secondary battery 10 can be produced, for example, as follows.

First, the anode active material layer 1b is formed on the negative electrode current collector 1a to form a negative electrode 1.

When forming the anode active material layer 1b of a coating type, for example, an anode active material including at least one member selected from a simple substance of silicon and a compound thereof, and a simple substance of tin and a compound thereof is first pulverized into fine particles, and the resultant particles and optionally a conductor and a binder are mixed with one another to prepare a composition.

Next, the composition is dispersed in a dispersing medium, such as N-methylpyrrolidone (NMP), to form a composition in a slurry state, and the composition slurry is applied to the negative electrode current collector 1a, and then the dispersing medium is evaporated, followed by compression molding, to form a negative electrode 1.

When forming the anode active material layer 1b of a thin film type, the anode active material layer 1b including at least one member selected from a simple substance of silicon and a compound thereof, and a simple substance of tin and a compound thereof is first formed on the negative electrode current collector 1a by, e.g., a vapor phase method, a spray coating method, a calcination method, or a liquid phase method. Examples of vapor phase methods include a physical deposition method and a chemical deposition method, and, specifically, a vacuum deposition process, a sputtering process, an ion plating process, a laser ablation process, a chemical vapor deposition (CVD) process, or a spray coating method may be used. As an example of a liquid phase method, there can be mentioned plating. Alternatively, the anode active material layer 1b may be formed by a combination of the above two or more methods or a combination of the above method(s) and another method.

When the anode active material layer 1b contains oxygen, the oxygen content of the anode active material layer is controlled by, for example, adding oxygen to the atmosphere used for forming the anode active material layer 1b, adding oxygen to the atmosphere for the calcination or heating, or changing the oxygen concentration of the anode active material particles used.

When the anode active material layer 1b is formed by alternately stacking a first layer having a smaller oxygen content and a second layer having an oxygen content larger than that of the first layer as mentioned above, the oxygen content of the anode active material layer may be controlled by changing the oxygen concentration of the atmosphere, or the first layer is formed and then the surface of the first layer may be oxidized to form the second layer.

The anode active material layer 1b is formed and then, the resultant current collector may be subjected to heat treatment in a vacuum atmosphere or in an non-oxidative atmosphere to further alloy the interface between the negative electrode current collector 1a and the anode active material layer 1b.

Next, the cathode active material layer 2b is formed on the positive electrode current collector 2a. For example, a cathode active material and optionally a conductor and a binder are mixed with one another to prepare a composition, and the composition is dispersed in a dispersing medium, such as NMP, to form a composition in a slurry state, and the composition slurry is applied to the positive electrode current collector 2a, and then subjected to compression molding to form a positive electrode 2.

Next, the negative electrode 1, the separator 3, and the positive electrode 2 are stacked on one another, and placed in a packaging cup 14 and a packaging can 15, and an electrolytic solution is charged, and the packaging cup and packaging can are caulked to assemble a lithium-ion secondary battery 10. In this instance, the negative electrode 1 and the positive electrode 2 are arranged so that the anode active material layer 1b faces the cathode active material layer 2b.

The lithium-ion secondary battery 20 can be produced, for example, as follows.

First, as mentioned above, the anode active material layer 1b is formed on the negative electrode current collector 1a to form a negative electrode 1. Separately, the cathode active material layer 2b is formed on the positive electrode current collector 2a to form a positive electrode 2.

Next, a negative electrode lead terminal 21 and a positive electrode lead terminal 22 are fitted to the negative electrode 1 and the positive electrode 2, respectively. The negative electrode 1 and the positive electrode 2 are then stacked through a separator 3, and they are together spirally wound in the short-side direction as a winding direction, and a protective tape 23 is bonded to the outermost layer to form a spirally-wound electrode structure 24. In this instance, the negative electrode 1 and positive electrode 2 are arranged so that the anode active material layer 1b faces the cathode active material layer 2b. Subsequently, for example, the spirally-wound electrode structure 24 is disposed between packaging members 26 and 27, and the outer edge portions of the packaging members 26 and 27 are bonded together by heat sealing or the like to close the battery. In this instance, a contact film 25 is disposed between the lead terminals 21 and 22 and the packaging members 26 and 27. Thus a lithium-ion secondary battery 20 of a laminate type is assembled.

When a polymer compound having kept the electrolytic solution is formed, the electrolytic solution and a polymerizable compound are placed in a container made of a packaging material, such as a laminated film, and the polymerizable compound is polymerized in the container to gel the electrolyte. For suppressing large expansion or shrinkage of the electrode, a metal can may be used as a container. Alternatively, before spirally winding the negative electrode 1 and positive electrode 2, a gel electrolyte is applied to the negative electrode 1 or positive electrode 2 by a coating method or the like, and then the separator 3 is disposed between the negative electrode 1 and the positive electrode 2 and they are together spirally wound.

When the assembled lithium-ion secondary battery 10 or 20 is charged, lithium ions are extracted from the positive electrode 2, and move through the electrolytic solution toward the negative electrode 1 and are reduced at the negative electrode 1, and the resultant lithium forms an alloy together with the anode active material and thus is taken in the negative electrode 1. When the battery is discharged, the lithium taken in the negative electrode 1 is extracted again as lithium ions, and the lithium ions move through the electrolytic solution toward the positive electrode 2 and occluded again in the positive electrode 2.

In the lithium-ion secondary battery 10 or 20, a simple substance or a compound of silicon is contained in the anode active material layer 1b as an anode active material, and therefore the secondary battery can be increased in capacity. In addition, the negative electrode in the present embodiment has the characteristic feature obtained by the method for producing the electrode, and hence the secondary battery is excellent in the cycle characteristics including the initial discharge capacity and capacity retention ratio.

EXAMPLES

Hereinbelow, the present invention will be descried in more detail with reference to the following Examples. In the following Examples, the same reference numerals and characters as those used in the above descriptions of the embodiments are used.

Example 1

In Example 1, an electrolytic copper foil having a surface roughened by an electrolytic treatment was used as a negative electrode current collector material. The conditions for roughening the surface were changed to obtain various electrolytic copper foils having different surface roughness or fine particle forms, namely, having different surface colors. With respect to each of the electrolytic copper foils, surface roughness Rz and Ra, and L*, a*, and b* values were measured as basic parameters for properties, and, with respect to the electrolytic copper foils having substantially the same surface roughness Rz and Ra and having different L*, a*, and b* values, a correlation between these parameters and the capacity retention ratio was determined.

Surface Treatment of Copper Foil

With respect to the electrolytic copper foil, an untreated copper foil is immersed in an electrolytic bath to form copper fine particles in an island form on the surface of the copper foil by an electrolytic process, thus roughening the surface. In the present Example, copper fine particles were first allowed to grow in an island form by plating on the surface of an untreated copper foil, and then the whole surface of the copper foil was coated by cover plating. The cover plating is conducted to prevent the copper fine particles from being removed from the surface. In this instance, the current ratio in each electrolytic bath, the temperature of the electrolytic bath, the number of the operation of plating or cover plating, the composition of the plating solution, the addition or the type of the additive, or the like was changed to obtain various electrolytic copper foils having different states of roughened surface.

Measurement of Surface Roughness

With respect to the surface roughness, surface roughness Rz and Ra were measured using Stylus Surface Profiler Dektak3, manufactured and sold by ULVAC, Inc. In the measurement, a stylus was scanned in the direction perpendicular to the winding direction of the copper foil, and an average of measurements of 5 points arbitrarily extracted was determined as an actual measurement.

Measurement of Chromaticity Coordinates in the L*A*B* Colorimetric System

A surface color of an electrolytic copper foil was measured using Spectrocolorimeter CD100, manufactured and sold by Yokogawa Meters & Instruments Corporation, to determine L*, a*, and b* values which are chromaticity coordinates in the L*a*b* calorimetric system. In the measurement, a viewing angle was 10°, and a light source was D65 (color temperature: 6,504 K).

Preparation and Evaluation of Test Lithium-Ion Secondary Battery

The above-obtained electrolytic copper foil having a surface roughened by an electrolytic treatment and having a thickness of 20 μm was used as a negative electrode current collector material, and a silicon layer having a thickness of 6 μm was first formed on the electrolytic copper foil as an anode active material layer by a vacuum deposition process using a deflecting electron beam evaporation source, thus forming an electrode for battery.

Next, for evaluating the performance of the electrode for battery, a coin-type test lithium-ion secondary battery having the same structure as that of the lithium-ion secondary battery 10 was prepared as follows. The above-obtained electrode for battery was first punched into a circular form having a diameter of 15 mm to form a negative electrode 1. Next, lithium cobaltite ($LiCoO_2$) as a cathode active material, carbon black as a conductor, and polyvinylidenefluoride (PVdF) as a binder were mixed with one an other to prepare a composition, and the composition was dispersed in NMP as a dispersing medium to form a composition in a slurry state, and the composition slurry was applied to a positive electrode current collector 2a made of an aluminum foil, and the dispersing medium was evaporated by drying, followed by compression molding, to form a cathode active material layer 2b, and the resultant foil was punched into a circular form, thus forming a positive electrode 2.

Next, the negative electrode 1, the separator 3, and the positive electrode 2 were stacked on one another, and an electrolytic solution was charged to assemble a test lithium-ion secondary battery. As the separator 3, a microporous polypropylene film was used. As the electrolytic solution, there was used a solution obtained by dissolving lithium hexa fluorophosphate ($LiPF_6$) as an electrolyte salt in a mixed solvent of ethylene carbonate (EC) and diethyl carbonate (DEC) in an EC:DEC weight ratio of 30:70 so that the concentration became 1 mol/dm$^3$.

With respect to the test secondary battery prepared, a charge-discharge cycle test was performed to determine a capacity retention ratio. In one cycle of this cycle test, charging was first conducted at a constant current of 1 mA/cm$^2$ until the battery voltage reached 4.2 V, and subsequently charging was conducted at a constant voltage of 4.2 V until the current density became 0.1 mA/cm$^2$. Next, discharging was conducted at a constant current of 1 mA/cm$^2$ until the battery voltage became 2.5 V. This charge-discharge cycle was repeated 50 cycles at room temperature, and a 50th-cycle capacity retention ratio (%) defined by the following formula:

50th-Cycle capacity retention ratio(%)=(Discharge capacity at the 50th cycle/Discharge capacity at the 1st cycle)×100(%)

was determined.

With respect to the coin-type test lithium-ion secondary batteries, a 50th-cycle capacity retention ratio (%) was determined. The results and other measurements are shown in Table 1.

TABLE 1

|  | L* | a* | b* | Ra | Rz | Capacity retention ratio (%) |
|---|---|---|---|---|---|---|
| Example 1-1 | 50 | 32 | 24 | 0.48 | 2.87 | 72.5 |
| Example 1-2 | 80 | 32 | 24 | 0.47 | 2.77 | 72.3 |
| Example 1-3 | 66 | 20 | 24 | 0.47 | 2.98 | 72.4 |
| Example 1-4 | 66 | 40 | 24 | 0.52 | 3.01 | 72.1 |
| Example 1-5 | 66 | 32 | 15 | 0.46 | 2.69 | 72.3 |
| Example 1-6 | 66 | 32 | 30 | 0.47 | 2.86 | 72.3 |
| Comparative Example 1-1 | 49 | 32 | 24 | 0.48 | 2.70 | 52.7 |
| Comparative Example 1-2 | 81 | 32 | 24 | 0.43 | 2.72 | 52.1 |
| Comparative Example 1-3 | 66 | 19 | 24 | 0.49 | 2.83 | 52.3 |
| Comparative Example 1-4 | 66 | 41 | 24 | 0.47 | 2.86 | 52.4 |
| Comparative Example 1-5 | 66 | 32 | 14 | 0.46 | 2.77 | 52.6 |
| Comparative Example 1-6 | 66 | 32 | 31 | 0.41 | 3.01 | 42.7 |
| Comparative Example 1-7 | 70 | 10 | 32 | 0.35 | 2.15 | 42.7 |
| Comparative Example 1-8 | 25 | 2.5 | 1.6 | 0.28 | 1.78 | 32.6 |

Examples 1-1 to 1-6 are examples in which the front surface color of the electrolytic copper foil is a color belonging to a color space in a preferred range of the present embodiment, i.e., 50≦L*≦80, 20≦a*≦40, 15≦b*≦30. In Examples 1-1 and 1-2, the respective L* values correspond to the lower limit and the upper limit; in Examples 1-3 and 1-4, the respective a* values correspond to the lower limit and the upper limit; and, in Examples 1-5 and 1-6, the respective b* values correspond to the lower limit and the upper limit. On the other hand, Comparative Examples 1-1 to 1-6 are examples in which the L*, a*, and b* values are individually lower or larger than the lower limit or upper limit of the range, and Comparative Examples 1-7 and 1-8 are examples in which the all L*, a*, and b* values are lower or larger than the lower limit or upper limit of the range.

In Examples 1-1 to 1-6, the charge-discharge cycle characteristics including capacity retention ratio are excellent, where as, in Comparative Examples 1-1 to 1-8, the cycle characteristics including capacity retention ratio are poor, and the results indicate that there is a close correlation between the values for color obtained in accordance with the L*a*b* calorimetric system and the charge-discharge cycle characteristics.

Example 2

In Examples 2-1 to 2-11, using various electrolytic copper foils having different front surface colors in the range of the preferred color space in Example 1, a more preferred front surface color of the electrolytic copper foil was found. The electrolytic copper foils were individually formed in the same manner as in Example 1 and the parameters for properties were measured, and a coin-type test lithium-ion secondary battery 10 was prepared and a 50th-cycle capacity retention ratio (%) was determined. The results are shown in Table 2.

TABLE 2

| | L* | a* | b* | Ra | Rz | Capacity retention ratio (%) | Comment |
|---|---|---|---|---|---|---|---|
| Example 2-1 | 50 | 20 | 15 | 0.48 | 2.87 | 72.5 | Each lowest |
| Example 2-2 | 80 | 40 | 30 | 0.47 | 2.77 | 72.4 | Each highest |
| Example 2-3 | 55 | 22 | 17 | 0.47 | 2.98 | 76.3 | Lower limit of more preferred range |
| Example 2-4 | 65 | 30 | 22 | 0.52 | 3.01 | 78.4 | Middle of more preferred range |
| Example 2-5 | 60 | 26 | 20 | 0.46 | 2.69 | 77.1 | Upper limit of more preferred range |
| Example 2-6 | 50 | 27 | 24 | 0.47 | 2.86 | 72.2 | L* lowest; a*, b* medium |
| Example 2-7 | 80 | 26 | 25 | 0.41 | 2.54 | 72.6 | L* highest; a*, b* medium |
| Example 2-8 | 62 | 20 | 23 | 0.43 | 2.72 | 71.6 | a* lowest; b*, L* medium |
| Example 2-9 | 61 | 40 | 18 | 0.42 | 2.83 | 72.9 | a* highest; b*, L* medium |
| Example 2-10 | 64 | 28 | 15 | 0.47 | 2.86 | 72.7 | b* lowest; L*, a* medium |
| Example 2-11 | 59 | 32 | 30 | 0.41 | 2.54 | 73.3 | b* highest; L*, a* medium |

Examples 2-3 to 2-5 are examples in which the front surface color of the electrolytic copper foil is a color belonging to a color space in a more preferred range of the present embodiment, i.e., $55 \leq L^* \leq 65$, $22 \leq a^* \leq 30$, $17 \leq b^* \leq 22$. Examples 2-6 to 2-11 are examples in which one of the L*, a*, and b* values falls outside of the above range. Examples 2-1 and 2-2 are examples in which the all L*, a*, and b* values fall outside of the above range.

The charge-discharge cycle characteristics including capacity retention ratio in Examples 2-3 to 2-5 are excellent, as compared to those in Examples 2-1, 2-2, and 2-6 to 2-11, and the results indicate that there is a close correlation between the values for color obtained in accordance with the L*a*b* calorimetric system and the charge-discharge cycle characteristics.

Example 3

In Example 3, the electrode for battery prepared in Example 1-1 was further subjected to annealing in a general vacuum furnace at 120° C. for 10 hours to prepare an electrode. With respect to the electrode prepared, elemental distribution was measured by EDX and compared to that of the electrode for battery prepared in Example 1-1. As a result, the EDX measurement has confirmed that, in at least part of the interface region between the copper foil as the electrode current collector and the silicon layer as the active material layer, silicon atoms of the silicon layer at the interface diffuse into the crystallite which constitutes the copper foil.

Next, using the above-prepared electrode, a secondary battery was prepared in the same manner as in Example 1, and a 50th-cycle capacity retention ratio was measured. The results are shown in Table 3.

TABLE 3

| | Vacuum furnace annealing | Comment | Capacity retention ratio (%) |
|---|---|---|---|
| Example 3 | 120° C., 10 hr | Diffusion of silicon atoms found at interface | 76.6 |
| Example 1-1 | None | No diffusion of elements found at interface | 72.5 |

As can be seen from Table 3, the capacity retention ratio in Example 3 was improved, as compared to that in Example 1-1. The reason for this is presumed that the silicon atoms at the interface diffuse into the crystallite to an appropriate extent, thus making strong the bonding between the anode active material layer and the negative electrode current collector layer.

Example 4

Example 4 is an example in which the active material layer is formed on both surfaces of the electrolytic copper foil. When the active material layer is formed on the both surfaces, the capacity is advantageously increased about two times that obtained when the active material layer is formed on one surface.

In Example 4, a silicon layer having a thickness of 6 μm was first formed as an anode active material layer 1b individually on both surfaces of the electrolytic copper foil by a vacuum deposition process using a deflecting electron beam evaporation source in substantially the same manner as in Example 1, except that an electrolytic copper foil having a front surface and a back surface each roughened by copper fine particles fixed to the front surface and back surface by an electrolytic treatment, and having a thickness of 20 μm was used, to form an electrode structure. The thus obtained electrode structure was subjected to heating in an argon gas atmosphere at 280° C. for 6 hours, and then a negative electrode lead terminal 21 was fitted to the resultant electrode structure, thus forming a test negative electrode 1.

Next, lithium cobaltite ($LiCoO_2$) as a cathode active material, carbon black as a conductor, and polyvinylidene fluoride (PVdF) as a binder were mixed with one another to prepare a composition, and the composition was dispersed in NMP as a dispersing medium to form a composition in a slurry state, and the composition slurry was applied to a positive electrode current collector 2a made of an aluminum foil, and the dispersing medium was evaporated by drying, followed by compression molding, to form a cathode active material layer 2b. Next, a positive electrode lead terminal 22 was fitted to form a positive electrode 2.

Next, the negative electrode 1 and the positive electrode 2 were stacked through a separator 3, and they were together spirally wound to prepare a spirally-wound electrode structure 24. The spirally-wound electrode structure 24 was then disposed between packaging members 26 and 27, and the outer edge portions of the packaging members 26 and 27 were bonded together by heat sealing to close the battery. In this instance, a contact film 25 was disposed between the lead terminals 21 and 22 and the packaging members 26 and 27. Thus a lithium-ion secondary battery 20 of a laminate type was assembled.

As the separator 3, a microporous polypropylene film was used. As the electrolytic solution, there was used a solution obtained by dissolving lithium hexa fluorophosphate ($LiPF_6$) as an electrolyte salt in a mixed solvent of ethylene carbonate (EC) and diethyl carbonate (DEC) in an EC:DEC weight ratio of 30:70 so that the concentration became 1 $mol/dm^3$.

Evaluation of Lithium-Ion Secondary Battery

With respect to the test secondary battery prepared, a charge-discharge cycle test was performed to determine a capacity retention ratio. In one cycle of this cycle test, charging was conducted at a constant current density of 5 $mA/cm^2$ until the battery voltage reached 4.2 V, and subsequently charging was conducted at a constant voltage of 4.2 V until the current density became 0.5 $mA/cm^2$ and then, discharging was conducted at a constant current density of 5 $mA/cm^2$ until the battery voltage became 2.5V. This charge-discharge cycle was repeated 50 cycles at room temperature, and a 50th-cycle capacity retention ratio defined by the following formula:

50th-Cycle capacity retention ratio(%)=(Discharge capacity at the 50th cycle/Discharge capacity at the 1st cycle)×100(%)

was determined. The results and measurements of thickness increase ratio during the charging are shown in Table 4.

TABLE 4

|  | Front | | | Back | | | Capacity retention | |
| --- | --- | --- | --- | --- | --- | --- | --- | --- |
|  | L* | a* | b* | L* | a* | b* | ratio (%) | Comment |
| Example 4-1 | 55 | 22 | 17 | 55 | 22 | 17 | 75.3 | Front and back sides the same |
| Example 4-2 | 55 | 22 | 17 | 58 | 28 | 20 | 77.9 | Front and back sides different |
| Example 4-3 | 55 | 22 | 17 | 62 | 22 | 17 | 78.9 | L* different |
| Example 4-4 | 55 | 22 | 17 | 55 | 24 | 17 | 76.4 | a* different |
| Example 4-5 | 55 | 22 | 17 | 55 | 22 | 20 | 77.7 | b* different |

As apparent from the comparison between Example 4-1 and Examples 4-2 to 4-5, in the electrolytic copper foil having the active material layer formed on both the front surface and the back surface, when the front surface color and the back surface color are different from each other in such a way that at least one of the numeric values determined based on the L*a*b* calorimetric system, namely, at least one of the L*, a*, and b* values is different from that of the other, the cycle characteristics including capacity retention ratio are excellent. The reason for this is not clear, but it is presumed that the stresses caused during the charging or discharging are relaxed in such a case.

Example 5

Example 5 is an example using an electrolytic copper foil having a diffraction peak intensity ratio of copper in an X-ray diffraction measurement wherein the peak intensity ratio satisfies the relationship: I (220)/I (111)≦1, wherein the electrolytic copper foil has a front surface and a back surface each roughened by an electrolytic treatment, and has a ten-point average surface roughness Rz on the front surface side of 2.0 μm≦Rz≦4.5 μm and a ten-point average surface roughness Rz on the back surface side of 2.5 μm≦Rz≦5.5 μm, as measured in accordance with JIS B0601, wherein the front surface color is a color belonging to a color space represented by:

45≦L*≦65, 20≦a*≦30, 15≦b*≦25, and the back surface color is a color belonging to a color space represented by:

50≦L*≦70, 20≦a*≦30, 15≦b*≦25, where L*, a*, and b* are numeric values determined based on the L*a*b* calorimetric system.

In Comparative Example 5-1, an electrode was prepared using an electrolytic copper foil having crystalline properties different from those of the copper foil used in Example 5 and having surface roughness and color properties almost equivalent to those of the copper foil used in Example 5, and the battery properties were evaluated. In Comparative Examples 5-2 to 5-5, an electrode was prepared using a copper foil having a surface roughness Rz which falls outside of the range in Example 5, and the battery properties were evaluated. In Comparative Examples 5-6 to 5-17, an electrode was prepared using a copper foil having L*a*b* values of the front surface color, which fall outside of the respective ranges in Example 5, and the battery performance was evaluated. The results are shown in Table 5.

TABLE 5-1

|  | I (220)/ I (111) | Front surface (M side) | | | | Back surface (S side) | | | | Capacity retention ratio (%) | Conditions changed |
| --- | --- | --- | --- | --- | --- | --- | --- | --- | --- | --- | --- |
|  |  | Rz | L* | a* | b* | Rz | L* | a* | b* |  |  |
| Example 5 | 0.3 | 2.63 | 48.8 | 22.2 | 15.9 | 2.84 | 68.4 | 22.6 | 16.7 | 76.4 |  |
| Comparative Example 5-1 | 2.1 | 2.66 | 47.9 | 23.1 | 16.7 | 3.02 | 69.1 | 22.1 | 17.3 | 33.1 | Crystal system |
| Comparative Example 5-2 | 0.3 | 4.57 | 45.2 | 28.1 | 18.8 | 2.88 | 68.3 | 22.9 | 16.1 | 56.4 | M side roughness |
| Comparative Example 5-3 | 0.3 | 1.98 | 58.9 | 23.5 | 18.9 | 2.78 | 67.8 | 23.8 | 15.9 | 45.1 | M side roughness |
| Comparative Example 5-4 | 0.3 | 2.62 | 47.6 | 22.9 | 16.3 | 5.73 | 53.1 | 26.1 | 19.4 | 52.1 | S side roughness |

TABLE 5-1-continued

|  | I (220)/ I (111) | Front surface (M side) | | | | Back surface (S side) | | | | Capacity retention ratio (%) | Conditions changed |
| --- | --- | --- | --- | --- | --- | --- | --- | --- | --- | --- | --- |
|  |  | Rz | L* | a* | b* | Rz | L* | a* | b* | | |
| Comparative Example 5-5 | 0.3 | 2.59 | 47.1 | 23.2 | 15.8 | 2.41 | 69.9 | 20.3 | 16.1 | 41.1 | S side roughness |
| Comparative Example 5-6 | 0.3 | 2.64 | 65.2 | 23.7 | 18.8 | 3.10 | 68.3 | 23.6 | 17.6 | 56.6 | L* (M) |
| Comparative Example 5-7 | 0.3 | 2.58 | 44.8 | 28.9 | 18.1 | 3.11 | 68.4 | 23.8 | 17.1 | 56.4 | L* (M) |
| Comparative Example 5-8 | 0.3 | 2.49 | 48.4 | 30.3 | 18.2 | 2.98 | 68.1 | 23.1 | 17.3 | 68.1 | a* (M) |
| Comparative Example 5-9 | 0.3 | 2.71 | 47.9 | 19.8 | 18.7 | 2.77 | 68.3 | 22.7 | 16.7 | 67.9 | a* (M) |
| Comparative Example 5-10 | 0.3 | 2.62 | 48.6 | 22.4 | 14.4 | 2.75 | 68.9 | 23.1 | 16.8 | 66.2 | b* (M) |
| Comparative Example 5-11 | 0.3 | 2.69 | 48.8 | 23.3 | 25.9 | 2.83 | 69.0 | 23.7 | 16.9 | 66.8 | b* (M) |
| Comparative Example 5-12 | 0.3 | 2.63 | 48.4 | 23.1 | 18.4 | 2.87 | 70.3 | 22.8 | 16.8 | 46.8 | L* (S) |
| Comparative Example 5-13 | 0.3 | 2.72 | 48.0 | 23.7 | 18.1 | 2.91 | 49.9 | 26.7 | 19.6 | 43.9 | L* (S) |

TABLE 5-2

|  | I (220)/ I (111) | Front surface (M side) | | | | Back surface (S side) | | | | Capacity retention ratio (%) | Conditions changed |
| --- | --- | --- | --- | --- | --- | --- | --- | --- | --- | --- | --- |
|  |  | Rz | L* | a* | b* | Rz | L* | a* | b* | | |
| Comparative Example 5-14 | 0.3 | 2.57 | 48.7 | 23.5 | 17.9 | 2.94 | 68.4 | 31.2 | 16.4 | 59.1 | a* (S) |
| Comparative Example 5-15 | 0.3 | 2.37 | 49.1 | 23.4 | 18.6 | 2.76 | 68.1 | 19.8 | 16.7 | 60.3 | a* (S) |
| Comparative Example 5-16 | 0.3 | 2.70 | 47.9 | 23.1 | 18.3 | 3.31 | 68.3 | 22.6 | 25.6 | 58.3 | b* (S) |
| Comparative Example 5-17 | 0.3 | 2.58 | 48.1 | 23.7 | 18.1 | 3.08 | 68.5 | 22.6 | 14.7 | 59.7 | b* (S) |

Example 6

In Examples 6-1 to 6-7, an electrode was prepared using a copper foil having a surface roughness which falls in an especially preferred range within the range of Example 5, and the battery performance was evaluated. In Examples 6-8 to 6-14, an electrode was prepared using a copper foil having L*a*b* values which fall in especially preferred respective ranges within the ranges of Example 5, and the battery performance was evaluated.

TABLE 6-1

|  | Front surface (M side) | | | | | Back surface (S side) | | | | | Capacity retention ratio (%) | Conditions changed |
| --- | --- | --- | --- | --- | --- | --- | --- | --- | --- | --- | --- | --- |
|  | Rz | Ra | L* | a* | b* | Rz | Ra | L* | a* | b* | | |
| Example 5 | 2.63 | 0.48 | 45.7 | 22.2 | 15.9 | 2.84 | 0.63 | 68.4 | 22.6 | 16.7 | 76.4 | |
| Example 6-1 | 2.83 | 0.51 | 45.3 | 24.3 | 18.1 | 2.91 | 0.63 | 68.3 | 22.8 | 16.8 | 78.3 | M side roughness ○ |
| Example 6-2 | 3.21 | 0.61 | 46.2 | 24.4 | 18.3 | 2.88 | 0.61 | 67.9 | 22.3 | 16.5 | 81.9 | M side roughness ◉ |
| Example 6-3 | 3.51 | 0.65 | 46.9 | 24.2 | 18.5 | 2.89 | 0.62 | 67.8 | 22.5 | 16.6 | 78.1 | M side roughness ○ |
| Example 6-4 | 2.61 | 0.47 | 47.1 | 22.1 | 16.8 | 4.21 | 0.80 | 53.2 | 22.6 | 18.3 | 79.1 | S side roughness ○ |
| Example 6-5 | 2.65 | 0.48 | 47.5 | 22.6 | 16.3 | 4.87 | 0.86 | 53.6 | 22.8 | 18.7 | 81.3 | S side roughness ◉ |
| Example 6-6 | 2.71 | 0.47 | 46.6 | 22.3 | 16.7 | 5.20 | 0.95 | 53.3 | 22.9 | 18.6 | 78.4 | S side roughness ○ |
| Example 6-7 | 3.22 | 0.62 | 47.1 | 24.4 | 18.8 | 4.91 | 0.88 | 53.8 | 22.8 | 18.7 | 83.6 | Each side roughness ◉ |

TABLE 6-1-continued

| | Front surface (M side) | | | | | Back surface (S side) | | | | | Capacity retention ratio (%) | Conditions changed |
|---|---|---|---|---|---|---|---|---|---|---|---|---|
| | Rz | Ra | L* | a* | b* | Rz | Ra | L* | a* | b* | | |
| Example 6-8 | 3.41 | 0.59 | 52.2 | 26.0 | 19.0 | 2.99 | 0.84 | 68.2 | 22.3 | 16.4 | 85.1 | M side color ○ |
| Example 6-9 | 3.38 | 0.58 | 57.6 | 27.3 | 19.5 | 3.02 | 0.85 | 67.7 | 22.5 | 16.2 | 87.1 | M side color ◉ |
| Example 6-10 | 3.34 | 0.61 | 59.9 | 29.0 | 18.9 | 3.10 | 0.91 | 68.0 | 22.2 | 16.0 | 85.3 | M side color ○ |
| Example 6-11 | 2.67 | 0.48 | 47.3 | 22.1 | 16.4 | 4.99 | 0.91 | 55.2 | 23.1 | 17.6 | 85.1 | S side color ○ |

TABLE 6-2

| | Front surface (M side) | | | | | Back surface (S side) | | | | | Capacity retention ratio (%) | Conditions changed |
|---|---|---|---|---|---|---|---|---|---|---|---|---|
| | Rz | Ra | L* | a* | b* | Rz | Ra | L* | a* | b* | | |
| Example 6-12 | 2.81 | 0.47 | 46.3 | 22.8 | 16.3 | 4.93 | 0.89 | 59.8 | 26.5 | 19.3 | 88.6 | S side color ◉ |
| Example 6-13 | 2.77 | 0.49 | 47.6 | 23.0 | 16.2 | 4.89 | 0.90 | 69.8 | 27.8 | 21.4 | 84.9 | S side color ○ |
| Example 6-14 | 3.15 | 0.61 | 57.8 | 26.9 | 19.3 | 4.88 | 0.89 | 59.5 | 26.7 | 19.1 | 91.9 | Each side color ◉ |

Example 7

In Example 7, a cross-section of a copper foil was obtained by means of a cross-section polisher (CP), and examined under a low accelerating-voltage scanning electron microscope (SEM) to measure a size of crystallites constituting the copper foil. Before depositing an active material layer, the electrolytic copper foil was subjected to heating (annealing), and then an active material layer was deposited on the resultant electrolytic copper foil.

Next, an electrode for battery and a secondary battery were prepared in the same manner as in Example 1, and a 50th-cycle capacity retention ratio was measured. The results are shown in Table 7.

TABLE 7

| | Annealing temperature for copper foil | Crystallites having a cross-section area of more than 100 μm² | Capacity retention ratio (%) | Elongation (%) | Young's modulus (MPa) |
|---|---|---|---|---|---|
| Examples 5 | No | None | 76.4 | 3.1 | $4.92 \times 10^9$ |
| Examples 7-1 | 250° C. | None | 79.3 | 4.8 | $6.32 \times 10^8$ |
| Examples 7-2 | 350° C. | None | 85.6 | 8.9 | $5.93 \times 10^7$ |
| Examples 7-3 | 450° C. | Appeared | 70.1 | 10.1 | $3.61 \times 10^6$ |
| Examples 7-4 | 550° C. | Appeared | 69.1 | 11.4 | $1.61 \times 10^6$ |

With respect to each of the copper foils treated by heating (annealing) at different temperatures, a cross-section was examined. As a result, it has been found that, in Examples 7-1 and 7-2 in which the heating (annealing) temperature is relatively low, the higher the heating temperature, the larger the size of crystallites constituting the copper foil, or the more excellent the capacity retention ratio. Further, it has been found that, in Examples 7-3 and 7-4 in which the heating temperature is too high and crystallites having across-section area of more than 100 μm² appear in the copper foil treated by heating, the higher the heating temperature, the poorer the capacity retention ratio. Therefore, it is desired that the crystallites in the copper foil having this crystal system have a size of 100 μm² or less.

Figure 7A:
FIGS. 7A and 7B are photographs of the cross-sections, examined under a scanning electron microscope, of the electrolytic copper foil after the heating (FIG. 7A) and the electrolytic copper foil before the heating (FIG. 7B) in Example 7 of an embodiment of the present invention.
Figure 7B:
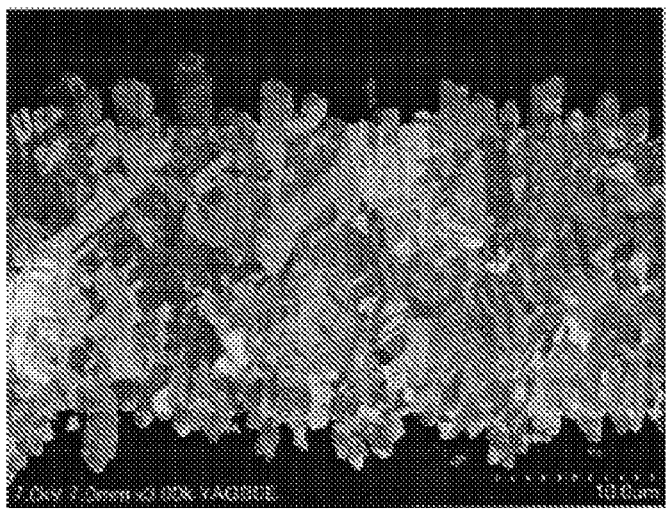

FIGS. 7A and 7B are photographs of the cross-sections, examined under a scanning electron microscope, of the electrolytic copper foil after the heating (FIG. 7A) and the electrolytic copper foil before the heating (FIG. 7B) in Example 7-2. From a comparison between FIGS. 7A and 7B, it is apparent that the heating causes the crystallites constituting the electrolytic copper foil to increase in size.

A copper foil was annealed under the above annealing conditions, and an elongation, a breaking strength, and a Young's modulus of the resultant copper foil were measured. As a result, it has been found that, with respect to the copper foil which satisfies the requirement: I (200)/I (111)<1, the elongation is 1 to 10% and the Young's modulus is $5.0 \times 10^7$ to $5.0 \times 10^9$ MPa.

Example 8

In Example 8, the relationship between the heating (annealing) and the diffusion of copper was determined. The electrode prepared in Example 5 was subjected to heating at different temperatures, and a peak intensity ratio of copper I (200)/I (111) was also measured by XRD.

Next, an electrode for battery and a secondary battery were prepared in the same manner as in Example 1, and a 50th-cycle capacity retention ratio was measured. The results are shown in Table 8.

When the heating temperature was 400° C. or higher, the peak intensity ratio I (200)/I (111) was 1 or more, and the cycle characteristics were improved at a heating temperature at which the peak intensity ratio was 1 or lower, and the cycle characteristics were lowered at a heating temperature at which the peak intensity ratio was 1 or more.

After the measurement of the cycle characteristics, a cross-section of each electrode was obtained by means of a CP, and examined under a SEM/EDX. Differing from the electrode in Example 5, which was not subjected to heating, in the electrode in Examples 8-1 to 8-4, which was subjected to heating and which had an XRD intensity ratio of 1 or less, diffusion of silicon and copper into each other was observed at the interface. Further, with respect to this electrode, a peak ascribed to $Cu_3Si$ was not observed in XRD. By contrast, in the electrode which was subjected to annealing and which had an XRD intensity ratio of more than 1, the diffusion of elements proceeded to excess at the interface, and $Cu_3Si$ was observed at part of the interface and a peak ascribed to $Cu_3Si$ was observed in XRD.

TABLE 8

|  | Annealing temperature for copper foil | I (200)/ I (111) | $Cu_3Si$ | Capacity retention ratio (%) |
|---|---|---|---|---|
| Example 5 | No | 0.67 | Not found | 76.4 |
| Example 8-1 | 200° C. | 0.71 | Not found | 77.4 |
| Example 8-2 | 250° C. | 0.83 | Not found | 81.8 |
| Example 8-3 | 300° C. | 0.89 | Not found | 83.6 |
| Example 8-4 | 350° C. | 0.99 | Not found | 86.6 |
| Example 8-5 | 400° C. | 1.05 | Observed | 69.7 |
| Example 8-6 | 450° C. | 1.13 | Observed | 69.1 |
| Example 8-7 | 500° C. | 1.37 | Observed | 65.5 |

Example 9

In Example 9, with respect to each of the copper foils used in Example 5, Comparative Examples 5-2 to 5-5, and Examples 6-8 to 6-14, a surface area ratio was determined. In addition, with respect to each of the same copper foils, a transfer test for roughened surface of copper foil was conducted to examine the peel strength of the fine particles. The results are shown in Table 9-1.
Measurement of Surface Area of Copper Foil A surface area of the copper foil was measured as follows. When a surface area on the front surface side (M side) was measured, the same two copper foils were bonded together with an adhesive so that the respective back surface sides (S sides) faced each other, and punched into a circular form having a diameter of 16 mm to prepare a test specimen, and a BET surface area of the test specimen was measured. Next, an area of the side of the test specimen prepared was determined from the thickness of the test specimen, and the sum of the geometrical area of the both surfaces and the geometrical area of the side was subtracted from the BET surface area to determine a correction surface area. The correction surface area was divided by the geometrical surface area of the both surfaces to determine a surface area ratio R. The formulae for the calculation are as follows.

Correction surface area=BET surface area–(Sum of geometrical surface area of top/bottom faces and geometrical surface area of side of a test specimen)

Surface area ratio R=Correction surface area/Geometrical surface area of both surfaces
Transfer Test for Copper Foil With respect to each of the copper foils used in Example 5, the "transfer test for roughened surface of copper foil" described in IPC (IPC-No. 2.4.1.5) was conducted. As a result, as shown in Table 9-1, it has been found that the all foils are electrolytic copper foils rated (2) very slightly transferred, (3) slightly transferred, or (4) transferred.

TABLE 9-1

|  | Surface area ratio | | Transfer test | | Capacity retention ratio (%) |
|---|---|---|---|---|---|
|  | Front surface | Back surface | Front surface | Back surface |  |
| Example 5 | 3.1 | 3.3 | (3) | (3) | 76.4 |
| Comparative Example 5-2 | 1.4 | 3.2 | (1) | (4) | 56.4 |
| Comparative Example 5-3 | 1.1 | 3.3 | (1) | (4) | 45.1 |
| Comparative Example 5-4 | 3.6 | 6.1 | (4) | (1) | 52.1 |
| Comparative Example 5-5 | 3.5 | 1.8 | (4) | (1) | 41.1 |
| Example 6-8 | 3.4 | 3.4 | (2) | (2) | 85.1 |
| Example 6-9 | 4.2 | 3.8 | (2) | (2) | 87.1 |
| Example 6-10 | 5.3 | 3.7 | (2) | (2) | 85.3 |
| Example 6-11 | 3.1 | 4.2 | (3) | (3) | 85.1 |
| Example 6-12 | 3.6 | 5.9 | (3) | (3) | 88.6 |
| Example 6-13 | 3.3 | 4.7 | (3) | (3) | 84.9 |
| Example 6-14 | 3.95 | 3.7 | (2) | (3) | 91.9 |

Further, for obtaining supplemental data for determining the range of surface area ratio for the optimal properties, a charge or discharge capacity retention ratio was measured with respect to copper foils having different surface area ratios. As a result, it has been found that a copper foil having a surface area ratio R on the front surface side of $1.5 \leq R \leq 5.5$ and a surface area ratio R on the back surface side of $2.0 \leq R \leq 6.0$ exhibits excellent capacity retention ratio. The results are shown in Table 9-2.

TABLE 9-2

|  | Surface area ratio | | Transfer test | | Capacity retention ratio (%) |
|---|---|---|---|---|---|
|  | Front surface | Back surface | Front surface | Back surface |  |
| Example 9-1 | 1.4 | 3.8 | (1) | (3) | 57.3 |
| Example 9-2 | 1.5 | 3.7 | (2) | (3) | 64.1 |
| Example 9-3 | 3.5 | 3.8 | (3) | (3) | 68.7 |
| Example 9-4 | 5.5 | 3.6 | (3) | (3) | 64.6 |
| Example 9-5 | 5.7 | 3.8 | (4) | (3) | 51.3 |
| Example 9-6 | 3.9 | 1.9 | (3) | (1) | 56.7 |
| Example 9-7 | 3.9 | 2 | (3) | (2) | 64.9 |
| Example 9-8 | 3.8 | 3.8 | (3) | (2) | 66.8 |
| Example 9-9 | 4.1 | 6 | (3) | (3) | 69.1 |
| Example 9-10 | 3.9 | 6.2 | (3) | (4) | 57.6 |

Example 10

In Examples 10-1 to 10-6, electrodes for battery were individually formed in substantially the same manner as in Example 1 except that the oxygen gas feed rate during the deposition of silicon was changed and the degree of vacuum and the oxygen partial pressure were changed to obtain electrodes for battery having different oxygen contents of the anode active material layer. The oxygen content was measured by EDX. In Example 10-5, a silicon layer having a thickness of 3 μm was formed in the same manner as in Example 1, and then oxygen gas was introduced into the chamber to oxidize the surface of the silicon layer and then, another silicon layer was deposited thereon, thus forming one layer of a region having a larger oxygen content in the silicon layer. In Example 10-6, the same operation was repeated twice to form one layer of a region having a larger oxygen content on the surface and two layers of the region in the silicon layer.

Next, using the above-formed electrode for battery, a secondary battery was prepared in the same manner as in Example 1, and a 50th-cycle capacity retention ratio was measured. The results are shown in Table 10-1.

TABLE 10-1

| Oxygen content (atomic %) | | Oxygen distribution | Capacity retention ratio (%) |
|---|---|---|---|
| Example 10-1 | 4.9 | Uniformly dispersed in film | 72.4 |
| Example 1-1 | 7.2 | Uniformly dispersed in film | 72.5 |
| Example 10-2 | 20.0 | Uniformly dispersed in film | 78.4 |
| Example 10-3 | 40.0 | Uniformly dispersed in film | 79.1 |
| Example 10-4 | 41.5 | Uniformly dispersed in film | 72.2 |
| Example 10-5 | 20.5 | One oxygen layer at intermediate layer | 77.7 |
| Example 10-6 | 20.5 | One layer on film surface, and two layers in bulk | 78.1 |

In Examples 10-21 to 10-26, electrodes for battery were individually formed in substantially the same manner as in Example 5 except that the oxygen gas feed rate during the deposition of silicon was changed and the degree of vacuum and the oxygen partial pressure were changed to obtain electrodes for battery having different oxygen contents of the anode active material layer. The oxygen content was measured by EDX. In Example 10-25, a silicon layer having a thickness of 3 μm was formed in the same manner as in Example 1, and then oxygen gas was introduced into the chamber to oxidize the surface of the silicon layer and then, another silicon layer was deposited thereon, thus forming one layer of a region having a larger oxygen content in the silicon layer. In Example 10-26, the same operation was repeated twice to form one layer of a region having a larger oxygen content on the surface and two layers of the region in the silicon layer.

Next, using the above-formed electrode for battery, a secondary battery was prepared in the same manner as in Example 5, and the 50th-cycle capacity retention ratio was measured. The results are shown in Table 10-2.

TABLE 10-2

| Oxygen content (atomic %) | | Oxygen distribution | Capacity retention ratio (%) |
|---|---|---|---|
| Example 5 | 2.5 | Uniformly dispersed in film | 76.4 |
| Example 10-21 | 2.9 | Uniformly dispersed in film | 76.4 |
| Example 10-22 | 3.1 | Uniformly dispersed in film | 79.5 |
| Example 10-23 | 39.9 | Uniformly dispersed in film | 79.9 |
| Example 10-24 | 41.5 | Uniformly dispersed in film | 76.4 |
| Example 10-25 | 20.5 | One oxygen layer at intermediate layer | 81.8 |
| Example 10-26 | 20.5 | One layer on film surface, and two layers in bulk | 83.1 |

As can be seen from Table 10, when oxygen is contained in the active material and the oxygen content is 5 to 40 atomic %, the capacity retention ratio is advantageously improved. With respect to the oxygen distribution, in the same oxygen content, the improvement achieved when a layer having a larger oxygen content and a layer having a smaller oxygen content are stacked on one another is more remarkable than the improvement achieved when oxygen is uniformly distributed in the active material layer, and the larger the number of the layers stacked, the more remarkable the improvement.

Example 11

In Examples 11-1 and 11-2, secondary batteries were individually prepared in substantially the same manner as in Example 1 except that, instead of ethylene carbonate (EC) as a solvent for electrolyte in the electrolytic solution, fluoroethylene carbonate (FEC) and difluoroethylene carbonate (DFEC) were respectively used, and a 50th-cycle capacity retention ratio was measured in the same manner as in Example 1. The results are shown in Table 11-1. The changes of the solvent improved the capacity retention ratio by about 10%.

TABLE 11-1

| | Electrolyte composition | Capacity retention ratio (%) |
|---|---|---|
| Example 11-1 | FEC:DEC = 3:7 (EC→FEC) | 88.9 |
| Example 11-2 | DFEC:DEC = 3:7 (EC→DFEC) | 89.7 |
| Example 1-1 | EC:DEC = 3:7 | 72.5 |

Similarly, in Examples 11-21 to 11-26, secondary batteries were individually prepared insubstantially the same manner as in Example 5 except that, instead of ethylene carbonate (EC) as a solvent for electrolyte in the electrolytic solution, fluoroethylene carbonate (FEC) or difluoroethylene carbonate (DFEC) was used, and the composition was changed, and a 50th-cycle capacity retention ratio was measured in the same manner as in Example 5. The results are shown in Table 11-2. The amount of the additive was 7% by mass, based on the mass of the electrolytic solution. The changes of the solvent or the addition of additive improved the capacity retention ratio by about 10%.

TABLE 11-2

| | Electrolyte composition | Additive | Capacity retention ratio (%) |
|---|---|---|---|
| Example 5 | EC:DEC = 3:7 | | 76.4 |
| Example 11-21 | FEC:DEC = 3:7 (EC→FEC) | | 85.3 |
| Example 11-22 | DFEC:DEC = 3:7 (EC→DFEC) | | 88.7 |
| Example 11-23 | FEC:DEC = 3:7 EC→FEC) | Vinylene carbonate | 88.9 |
| Example 11-24 | FEC:DEC = 3:7 EC→FEC) | Vinylethylene carbonate | 88.8 |
| Example 11-25 | FEC:DEC = 3:7 EC→FEC) | 1,3-Propenesultone | 88.6 |
| Example 11-26 | FEC:DEC = 3:7 EC→FEC) | LiBF$_4$ | 88.8 |

Example 12

In Example 12, a secondary battery was prepared using propenesultone as an additive for the electrolytic solution used in Example 1 in an amount of 2% by mass, based on the mass of the electrolytic solution, and a 50th-cycle battery expansion ratio and a 50th-cycle capacity retention ratio were measured. The results are shown in Table 12. The addition of propenesultone reduced the battery expansion ratio, and improved the capacity retention ratio by about 5%.

TABLE 12

| | Propenesultone | Expansion ratio (%) | Capacity retention ratio (%) |
|---|---|---|---|
| Example 12 | Contained | 0.40 | 85.3 |
| Example 1-1 | None | 3.00 | 72.5 |

Hereinabove, the present invention is described with reference to the embodiments and Examples, but the present invention is not limited to the above embodiments and Examples, and can be changed or modified.

For example, in the above embodiments and Examples, the use of a coin-type can or film packaging material as a packaging member is described, but, in the present invention, the packaging member may have any form of cylinder, rectangle (rectangular cylinder), coin, and button or may be of a thin type or large size.

It should be understood by those skilled in the art that various modifications, combinations, sub-combinations and alterations may occur depending on design requirements and other factors insofar as they are within the scope of the appended claims or the equivalents thereof.

INDUSTRIAL APPLICABILITY

According to an embodiment of the present invention, the secondary battery uses a simple substance of silicon or tin as an anode active material, and hence achieves both large energy capacity and excellent cycle characteristics, thus enabling mobile electronic devices to be reduced in size, weight, and thickness and improved in usefulness.

What is claimed is:

1. A battery electrode comprising:
   an electrode current collector, the electrode current collector including an electrolytic copper foil,
   wherein,
      said front and rear surfaces of said electrolytic copper foil are roughened by copper or copper alloy particles affixed thereto,
      the electrode current collector has a front surface color and a back surface color, at least one of the front surface color and the back surface is a color belonging to a spherical color space, the color space being represented by:

$50 \leq L^* \leq 80, 5 \leq a^* < 60, 5 \leq b^* < 60$, where $L^*$, $a^*$, and $b^*$ are numeric values in which $L^*$ represents a position along a z-axis corresponding to brightness, $a^*$ represents a position along a circumferential direction corresponding to hue, and $b^*$ represents a position along a radial direction corresponding to chroma, and
      the front surface color and the back surface color are different from each other in such a way that at least one of the $L^*$, $a^*$, and $b^*$ numeric values of the front surface color is different from at least one of the $L^*$, $a^*$, and $b^*$ numeric values of the back surface color.

2. The electrode current collector according to claim 1, wherein at least one color of the front surface color and the back surface color is a color belonging to a color space represented by: $50 \leq L^* \leq 80, 20 \leq a^* \leq 40, 15 \leq b^* \leq 30$, where $L^*$, $a^*$, and $b^*$ are numeric values determined based on the $L^*a^*b^*$ colorimetric system.

3. The electrode current collector according to claim 2, wherein at least one color of the front surface color and the back surface color is a color belonging to a color space represented by: $55 \leq L^* \leq 65, 22 \leq a^* \leq 30, 17 \leq b^* \leq 22$, where $L^*$, $a^*$, and $b^*$ are numeric values determined based on the $L^*a^*b^*$ colorimetric system.

4. The electrode current collector according to claim 1, wherein the fine particles are provided by an electrolytic treatment.

5. The electrode current collector according to claim 4, wherein the electrolytic copper foil has a diffraction peak intensity ratio of copper in an X-ray diffraction measurement where the peak intensity ratio satisfies the relationship: I(220)/I(111)≦1, wherein the electrolytic copper foil has said front surface and said back surface each roughened by an electrolytic treatment, and has a ten-point averaged surface roughness Rz on the front surface side of 2.0 µm≦Rz≦4.5 µm and a ten-point averaged surface roughness Rz on the back surface side of 2.5 µm≦Rz≦5.5 µm,
   wherein
      the front surface color is a color belonging to a color space represented by:

$45 \leq L^* \leq 65, 20 \leq a^* \leq 30, 15 \leq b^* \leq 25$, and and the back surface color is a color belonging to a color presented by:

$50 \leq L^* \leq 70, 20 \leq a^* \leq 30, 15 \leq b^* \leq 25$, where $L^*$, $a^*$, and $b^*$ are numeric values determined based on the $L^*a^*b^*$ colorimetric system.

6. The electrode current collector according to claim 5, wherein the electrode current collector has a ten-point averaged surface roughness Rz on the front surface side of 2.8 µm≦Rz≦3.5 µm and a ten-point averaged surface roughness Rz on the back surface side of 4.2 µm≦Rz≦5.2 µm, and has a surface roughness Ra on the front surface side of 0.50 µm≦Ra≦0.65 µm and a surface roughness Ra on the back surface side of 0.80 µm≦Ra≦0.95 µm.

7. The electrode current collector according to claim 5, wherein the front surface color is a color belonging to a color space presented by:

$50 \leq L^* \leq 60, 25.5 \leq a^* \leq 29, 19 \leq b^* \leq 21$, and the back surface color is a color belonging to a color space represented by:

$55 \leq L^* \leq 70, 23 \leq a^* \leq 28, 17.5 \leq b^* \leq 21.5$, where $L^*$, $a^*$, and $b^*$ are numeric values determined based on the $L^*a^*b^*$ colorimetric system.

8. The electrode current collector according to claim 5, wherein the electrolytic copper foil is comprised of a plurality of crystallites, each of the crystallites having a cross-section area of 100 µm$^2$ or less.

9. The electrode current collector according to claim 5, wherein the electrolytic copper foil has a surface area ratio R on the front surface side of 1.5≦R≦5.5 and a surface area ratio R on the back surface side of 2.0≦R≦6.0,
   wherein the surface area ratio R is defined by the following formula:
   Surface area ratio R=Correction surface area/(Geometrical surface area of both surfaces)
   where:
      Correction surface area=BET surface area−(Sum of geometrical surface area of top/bottom faces and geometrical surface area of side of a test specimen).

10. The electrode current collector according to claim 5, wherein the electrolytic copper foil has a thickness of 10 to 25 µm, an elongation of 1 to 10%, and a Young's modulus of $5.0 \times 10^7$ to $5.0 \times 10^9$ MPa.

11. The electrode current collector according to claim 5, wherein the electrolytic copper foil is an electrolytic copper foil rated (2) very slightly transferred or (3) slightly transferred, in accordance with the "transfer test for roughened surface of copper foil" described in IPC (IPC-No. 2.4.1.5).

12. The electrode current collector according to claim 5, wherein the electrolytic copper foil is treated by heating.

13. The electrode for battery according to claim 1, which has an active material layer containing at least one substance selected from the group consisting of metallic lithium, metallic tin, a tin compound, a silicon simple substance, and a silicon compound.

14. The electrode for battery according to claim 1, wherein, in at least part of an interface region between the electrode current collector and the active material layer, a region in which the constituent of the electrode current collector and the constituent of the active material layer diffuse into each other is present.

15. The electrode for battery according to claim 13, wherein the active material layer is made of silicon.

16. The electrode for battery according to claim 13, wherein the active material layer contains oxygen as a constituent element in an amount of 3 to 40 atomic %.

17. The electrode for battery according to claim 16, wherein the active material layer has a region having a high oxygen content and being distributed in substantially the longitudinal direction of the electrode current collector.

18. A secondary battery having incorporated thereinto the battery electrode according to claim 1.

19. The secondary battery according to claim 18, which is a lithium secondary battery.

20. The secondary battery according to claim 18, which includes a solvent for electrolyte made of a cyclic carbonate having an unsaturated bond.

21. The secondary battery according to claim 20, wherein the cyclic carbonate having an unsaturated bond is vinylene carbonate or vinylethylene carbonate.

22. The secondary battery according to claim 18, which includes a solvent for electrolyte made of a fluorine compound obtained by fluorinating part of or all of hydrogens of at least one carbonate selected from a cyclic carbonate and a chain carbonate.

23. The secondary battery according to claim 22, wherein the fluorine compound is difluoroethylene carbonate.

24. The secondary battery according to claim 18, which includes an electrolyte containing a sultone.

25. The secondary battery according to claim 24, wherein the sultone is 1,3-propenesultone.

26. The secondary battery according to claim 18, which includes an electrolyte made of a compound containing boron and fluorine.

27. A method for inspecting an electrode current collector forming an electrode for a battery and being made of copper or a copper alloy, the method comprising:
  obtaining value(s) of the front surface color or the back surface color or both for each electrode current collector,
  determining whether or not at least one of the front surface color and the back surface color belongs to a spherical color space, the color space being represented by:

$50 \leq L^* \leq 80, 5 \leq a^* < 60, 5 \leq b^* < 60$, where $L^*$, $a^*$, and $b^*$ are numeric values in which $L^*$ represents a position along a z-axis corresponding to brightness, $a^*$ represents a position along a circumferential direction corresponding to hue, and $b^*$ represents a position along a radial direction corresponding to chroma, and
  selecting an electrode current collector having a color belonging to said color space as a conforming article.

28. A method for producing an electrode for a battery having an electrode current collector made of copper or a copper alloy, the method comprising:
  obtaining value(s) of the front surface color or the back surface color or both for each electrode current collector,
  determining whether or not at least one of the front surface color and the back surface color belongs to a color space within a spherical coordinate system, the color space being represented by:

$50 \leq L^* \leq 80, 5 \leq a^* < 60, 5 \leq b^* < 60$, where $L^*$, $a^*$, and $b^*$ are numeric values in which $L^*$ represents a position along a z-axis corresponding to brightness, $a^*$ represents a position along a circumferential direction corresponding to hue, and $b^*$ represents a position along a radial direction corresponding to chroma,
  selecting an electrode current collector having a color belonging to said color space as a conforming article, and
  producing an electrode for battery using the selected electrode current collector.

29. A method for producing a secondary battery having an electrode current collector made of copper or a copper alloy, the method comprising:
  obtaining value(s) of the front surface color or the back surface color or both for each electrode current collector,
  determining whether or not at least one of the front surface color and the back surface color belongs to a spherical color space, the color space being represented by:

$50 \leq L^* \leq 80, 5 \leq a^* < 60, 5 \leq b^* < 60$, where $L^*$, $a^*$, and $b^*$ are numeric values in which $L^*$ represents a position along a z-axis corresponding to brightness, $a^*$ represents a position along a circumferential direction corresponding to hue, and $b^*$ represents a position along a radial direction corresponding to chroma,
  selecting an electrode current collector having a color belonging to said color space as a conforming article,
  producing an electrode using the selected electrode current collector, and
  incorporating the produced electrode into the secondary battery.

* * * * *